(12) United States Patent
Yoshida

(10) Patent No.: US 11,560,149 B2
(45) Date of Patent: Jan. 24, 2023

(54) CONTROL APPARATUS

(71) Applicant: Mitsubishi Electric Corporation, Tokyo (JP)

(72) Inventor: Mikiya Yoshida, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 50 days.

(21) Appl. No.: 17/184,795

(22) Filed: Feb. 25, 2021

(65) Prior Publication Data

US 2022/0111854 A1    Apr. 14, 2022

(30) Foreign Application Priority Data

Oct. 9, 2020    (JP) .............................. JP2020-170870

(51) Int. Cl.
| | | |
|---|---|---|
| *B60Q 1/00* | (2006.01) | |
| *B60W 50/029* | (2012.01) | |
| *B60W 50/02* | (2012.01) | |
| *G07C 5/08* | (2006.01) | |

(52) U.S. Cl.
CPC ...... *B60W 50/029* (2013.01); *B60W 50/0205* (2013.01); *G07C 5/0816* (2013.01); *B60W 2050/021* (2013.01); *B60W 2050/0292* (2013.01)

(58) Field of Classification Search
CPC ............... B60W 50/029; B60W 50/02; B60W 2050/021; B60W 2050/0292; G07C 5/0816
USPC ....................................................... 340/438
See application file for complete search history.

(56) References Cited

U.S. PATENT DOCUMENTS

| | | | | |
|---|---|---|---|---|
| 5,964,811 A | * | 10/1999 | Ishii ..................... | F02D 41/266 701/33.9 |
| 6,112,148 A | * | 8/2000 | Baraban ................. | F02D 41/22 701/107 |
| 6,226,576 B1 | * | 5/2001 | Tomo ..................... | F02D 41/22 73/114.07 |
| 2017/0357560 A1 | | 12/2017 | Fukuda et al. | |

FOREIGN PATENT DOCUMENTS

JP    6393628 B2    9/2018

OTHER PUBLICATIONS

"Specification of Execution Management", AUTOSAR, AP R19-11, Nov. 28, 2019, 133 pages.

* cited by examiner

*Primary Examiner* — Tai T Nguyen
(74) *Attorney, Agent, or Firm* — Sughrue Mion, PLLC; Richard C. Turner

(57) ABSTRACT

A control apparatus is provided with a recovery control unit that issues an instruction saying that when there exists a process whose starting condition is an execution state of a process in which an abnormality has been detected, all of processes including the process whose starting condition is the execution state of the process in which the abnormality has been detected should temporarily be stopped and saying that after the process in which the abnormality had been detected has restarted, execution of the processes that have temporarily been stopped should be resumed, and a process execution management unit that restarts the process in which the abnormality has been detected and resumes the processes that have temporarily been stopped, in response to the instruction from the recovery control unit.

20 Claims, 14 Drawing Sheets

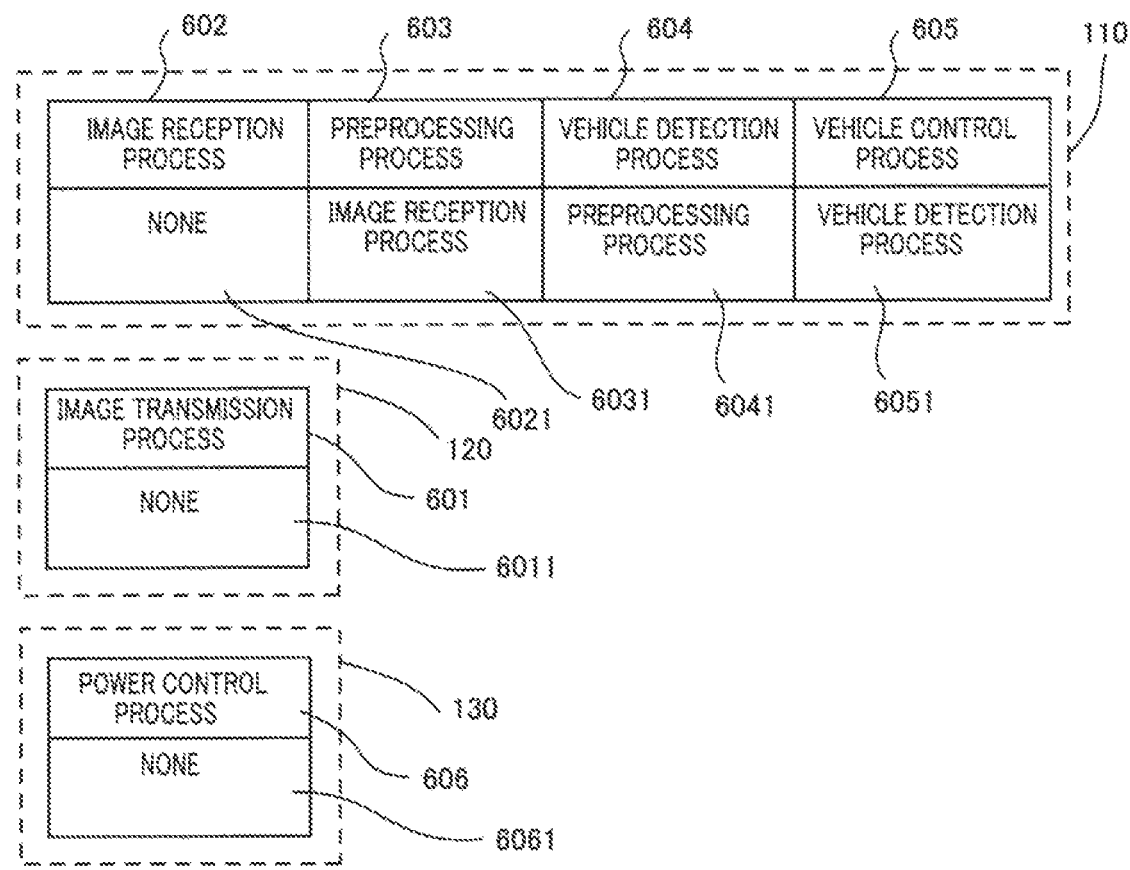

FIG. 12A

| PROCESS | WHETHER OR NOT STARTING CONDITION EXISTS | PROCESS TO BECOME STARTING CONDITION | STATE OF PROCESS |
|---|---|---|---|
| IMAGE RECEPTION PROCESS | NONE | — | UNSTARTED |
| PREPROCESSING PROCESS | EXISTING | IMAGE RECEPTION PROCESS | UNSTARTED |
| VEHICLE DETECTION PROCESS | EXISTING | PREPROCESSING PROCESS | UNSTARTED |
| VEHICLE CONTROL PROCESS | EXISTING | VEHICLE DETECTION PROCESS | UNSTARTED |

FIG. 12B

| PROCESS | WHETHER OR NOT STARTING CONDITION EXISTS | PROCESS TO BECOME STARTING CONDITION | STATE OF PROCESS |
|---|---|---|---|
| IMAGE RECEPTION PROCESS | NONE | — | INITIALIZED |
| PREPROCESSING PROCESS | EXISTING | IMAGE RECEPTION PROCESS | UNSTARTED |
| VEHICLE DETECTION PROCESS | EXISTING | PREPROCESSING PROCESS | UNSTARTED |
| VEHICLE CONTROL PROCESS | EXISTING | VEHICLE DETECTION PROCESS | UNSTARTED |

FIG. 12C

| PROCESS | WHETHER OR NOT STARTING CONDITION EXISTS | PROCESS TO BECOME STARTING CONDITION | STATE OF PROCESS |
|---|---|---|---|
| IMAGE RECEPTION PROCESS | NONE | — | UNDER EXECUTION |
| PREPROCESSING PROCESS | EXISTING | IMAGE RECEPTION PROCESS | UNSTARTED |
| VEHICLE DETECTION PROCESS | EXISTING | PREPROCESSING PROCESS | UNSTARTED |
| VEHICLE CONTROL PROCESS | EXISTING | VEHICLE DETECTION PROCESS | UNSTARTED |

FIG. 12D

| PROCESS | WHETHER OR NOT STARTING CONDITION EXISTS | PROCESS TO BECOME STARTING CONDITION | STATE OF PROCESS |
|---|---|---|---|
| IMAGE RECEPTION PROCESS | NONE | — | UNDER EXECUTION |
| PREPROCESSING PROCESS | EXISTING | IMAGE RECEPTION PROCESS | UNDER EXECUTION |
| VEHICLE DETECTION PROCESS | EXISTING | PREPROCESSING PROCESS | UNDER EXECUTION |
| VEHICLE CONTROL PROCESS | EXISTING | VEHICLE DETECTION PROCESS | TERMINATED |

FIG. 12E

| PROCESS | WHETHER OR NOT STARTING CONDITION EXISTS | PROCESS TO BECOME STARTING CONDITION | STATE OF PROCESS |
|---|---|---|---|
| IMAGE RECEPTION PROCESS | NONE | — | UNDER EXECUTION |
| PREPROCESSING PROCESS | EXISTING | IMAGE RECEPTION PROCESS | UNDER EXECUTION |
| VEHICLE DETECTION PROCESS | EXISTING | PREPROCESSING PROCESS | UNDER EXECUTION |
| VEHICLE CONTROL PROCESS | EXISTING | VEHICLE DETECTION PROCESS | TEMPORARILY STOPPED |

FIG. 12F

| PROCESS | WHETHER OR NOT STARTING CONDITION EXISTS | PROCESS TO BECOME STARTING CONDITION | STATE OF PROCESS |
|---|---|---|---|
| IMAGE RECEPTION PROCESS | NONE | — | UNDER EXECUTION |
| PREPROCESSING PROCESS | EXISTING | IMAGE RECEPTION PROCESS | UNDER EXECUTION |
| VEHICLE DETECTION PROCESS | EXISTING | PREPROCESSING PROCESS | TEMPORARILY STOPPED |
| VEHICLE CONTROL PROCESS | EXISTING | VEHICLE DETECTION PROCESS | TEMPORARILY STOPPED |

FIG. 17A

| PROCESS | WHETHER OR NOT STARTING CONDITION EXISTS | PROCESS TO BECOME STARTING CONDITION | STATE OF PROCESS |
|---|---|---|---|
| IMAGE RECEPTION PROCESS | NONE | — | UNDER EXECUTION |
| PREPROCESSING PROCESS | EXISTING | IMAGE RECEPTION PROCESS | UNDER EXECUTION |
| VEHICLE DETECTION PROCESS | EXISTING | PREPROCESSING PROCESS | UNDER EXECUTION |
| VEHICLE CONTROL PROCESS | EXISTING | VEHICLE DETECTION PROCESS | TERMINATED |

FIG. 17B

| PROCESS | WHETHER OR NOT STARTING CONDITION EXISTS | PROCESS TO BECOME STARTING CONDITION | STATE OF PROCESS |
|---|---|---|---|
| IMAGE RECEPTION PROCESS | NONE | — | UNDER EXECUTION |
| PREPROCESSING PROCESS | EXISTING | IMAGE RECEPTION PROCESS | TERMINATED |
| VEHICLE DETECTION PROCESS | EXISTING | PREPROCESSING PROCESS | TERMINATED |
| VEHICLE CONTROL PROCESS | EXISTING | VEHICLE DETECTION PROCESS | TERMINATED |

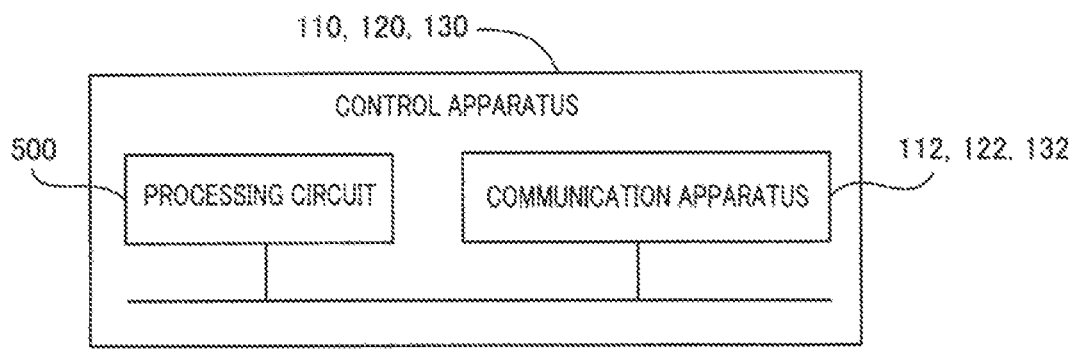

FIG. 18

CONTROL APPARATUS

BACKGROUND OF THE INVENTION

Field of the Invention

The present disclosure relates to a control apparatus.

Description of the Related Art

For example, a vehicle control apparatus to be mounted in an automobile or the like has a backup function on the assumption that part of the functions of the vehicle control apparatus fails. Such a backup function is applied to a driving assistance system for a vehicle such as an automobile, an automatic driving system for a vehicle, or the like; it is required that restoration of the system is performed in a short time after a system failure.

Patent Document 1 proposes a method in which when an abnormality in part of the cores in a multi-core processor is detected, the core in which the abnormality has been detected is restarted so as to shorten the time until the application is executed again. That is to say, Patent Document 1 discloses a method in which before starting diagnosis processing to be executed at a time when part of the processor cores is restarted, a processor executes processing of the other normal processor cores so that the time for restarting is shortened.

Meanwhile, the driving assistance system and the automatic driving system of an automobile are in a dependency relationship for each function; in sometimes, when the respective functions thereof are not executed, the systems cannot be maintained. For example, in the technology disclosed in Non-Patent Document 1, when a plurality of processes are executed in an control apparatus, the dependency relationship between the processes are solved before the processes are started and then the processes are started sequentially. For example, in the case where when a process A and a process B are started, there is set a condition that the process B is started when the process A is being executed, the control apparatus starts the process A and then starts the process B after confirming that the process A is being executed. On the other hand, also when the processes are terminated, the dependency relationship between the processes are solved and then the processes are terminated in the reverse order to that for having started the processes; specifically, when the process A is terminated, the process B and the process A are terminated in that order.

PRIOR ART REFERENCE

Patent Literature

[Patent Document 1] Japanese Patent No. 6393628
[Non-Patent Document 1] AUTOSAR "Specification of Execution Management", R19-11

SUMMARY OF THE INVENTION

In Patent Document 1, the dependency relationship for each function, such as that disclosed in Non-Patent Document 1, is not considered; there is considered only shortening of the time for restarting in a discrete function, but, the restoration time of the whole system is not considered. In contrast, in Non-Patent Document 1, in a process starting phase, there are performed initialization items such as securing of a memory area, creation of a process, and reading of data to be dealt with by the process; in a process terminating phase, there are performed process terminating items such as storing the data to be dealt with by the process, release of the memory area, and deletion of the process; however, the respective processing times for starting the process and terminating the process are not considered. Accordingly, in the case where an abnormality occurs in part of processes and the process in which the abnormality has occurred is restarted, a process that has a dependency relationship therewith and in which no abnormality has occurred is also restarted; thus, there has been a problem that it takes a long time until the system is restored.

The present disclosure has been implemented in order to solve the foregoing problem; the objective thereof is to provide a control apparatus that can suppress the time from a time point when an abnormality occurs in a process to a time point when the system is restored.

A control apparatus disclosed in the present disclosure includes
  a process execution management processor to manage execution of two or more processes each of respective starting conditions of which is an execution state of another process;
  a process abnormality monitoring processor to detect an abnormality in at least one process among the two or more processes; and
  a recovery control processor to issue to the process execution management processor an instruction saying that when there exists a process whose starting condition is an execution state of a process in which an abnormality has been detected by the process abnormality monitoring processor, all of processes including the process whose starting condition is the execution state of the process in which the abnormality has been detected should temporarily be stopped and saying that after the process in which the abnormality had been detected has restarted, execution of the processes that have temporarily been stopped should be resumed, wherein the process execution management processor compares the starting conditions with an execution state of said another process; in the case where there exists a process whose starting condition coincides with the execution state of said another process, the process execution management processor starts the process so that processing is executed; when the execution state of said another process becomes not to coincide with the starting conditions, the process execution management processor stops the process that has been started and whose processing is under execution, and restarts the process in which the abnormality has been detected and resumes processing of the process that has temporarily been stopped, in response to an instruction from the recovery control processor.

A control apparatus disclosed in the present disclosure includes
  a process execution management processor to manage execution of two or more processes each of respective starting conditions of which is an execution state of another process;
  a process abnormality monitoring processor to detect an abnormality in at least one process among the two or more processes; and
  a recovery control processor that raises a flag when there exists a process whose starting condition is an execution state of a process in which an abnormality has detected by the process abnormality monitoring processor and makes the process execution management processor temporarily stop processing items of all of processes including the process whose starting condition is the execution state of the process in which the abnormality has detected, that lowers the flag when the processing items of all of the processes have temporarily been stopped, that raises the flag and resumes the processing items of all of the processes that have temporarily been stopped, when the process in which the abnormality has detected restarts, and that lowers the flag when resumption of the processing items of all of the processes has been completed, wherein the process execution management processor compares the starting conditions with an execution state of said another process; in the case where there exists a process whose starting condition coincides with the execution state of said another process, the process execution management processor starts the process so that processing is executed; when the execution state of said another process becomes not to coincide with the starting conditions, the process execution management processor stops the process that has been started and whose processing is under execution; in the case where the flag has been raised, the process execution management processor enters a standby state without restarting the process in which the abnormality has been detected; in the case where the flag has been lowered, the process execution management processor executes restarting of the process in which the abnormality has been detected.

The present disclosure makes it possible to obtain a control apparatus that can suppress the time from a time point when an abnormality occurs in a process to a time point when the system is restored.

The foregoing and other object, features, aspects, and advantages of the present invention will become more apparent from the following detailed description of the present invention when taken in conjunction with the accompanying drawings.

BRIEF DESCRIPTION OF THE DRAWINGS

FIG. 9 is an explanatory diagram representing the execution states of the respective processes in the control apparatus according to Embodiment 1;

FIG. 10 is an explanatory table for explaining the function of an abnormality monitoring unit in the control apparatus according to Embodiment 1;

FIGS. 12A, 12B, 12C, 12D, 12E, and 12F are a set of explanatory tables representing starting management tables of a process execution management unit in the control apparatus according to Embodiment 1;

FIGS. 17A and 17B are a set of explanatory tables representing starting management tables of the process execution management unit in the control apparatus according to Embodiment 2; and FIG. 18 is a hardware configuration diagram representing the respective hardware configurations of the first control apparatus, the second control apparatus, and the third control apparatus in each of the control apparatuses according to Embodiments 1 and 2 at a time when the respective functions thereof are realized with hardware items.

DETAILED DESCRIPTION OF THE PREFERRED EMBODIMENTS

Embodiment 1

(1-1) Explanation for Configuration

Figure 1:
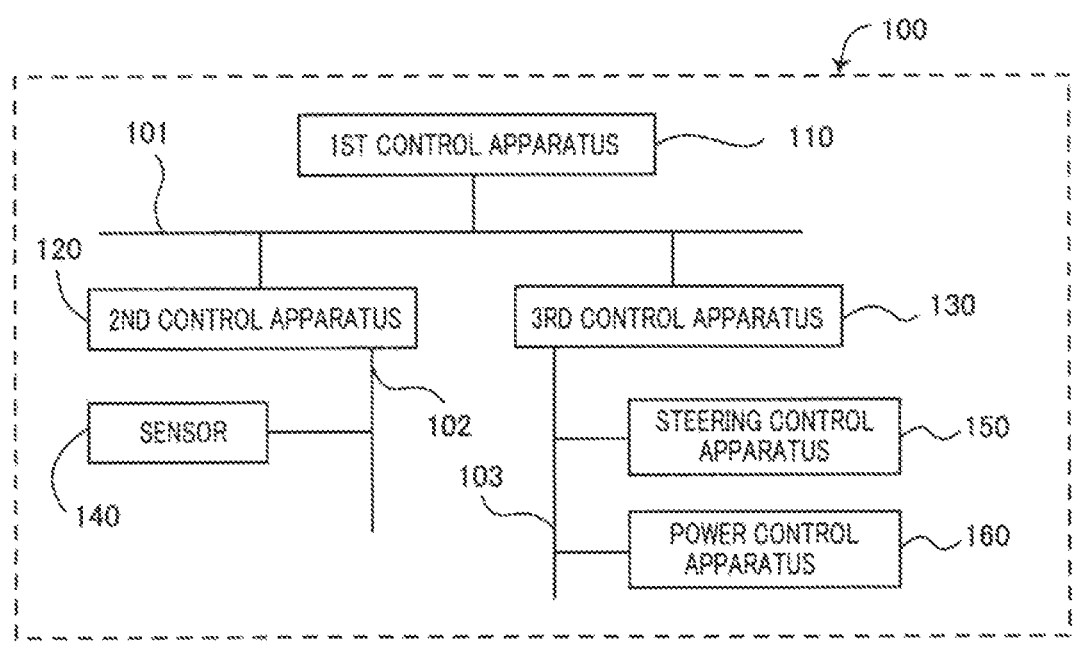
FIG. 1 is an explanatory diagram representing the configuration of a control apparatus according to Embodiment 1.

A control apparatus according to Embodiment 1 is configured as a control communication system in which a plurality of control apparatuses mounted in an automobile are connected with one another through a vehicle network. FIG. 1 is an explanatory diagram representing the configuration of a control apparatus according to Embodiment 1; a control apparatus is configured as a control communication system in a vehicle such as an automobile. Hereinafter, the overall configuration of the control communication system, as a control apparatus, will be explained by use of FIG. 1.

A control communication system 100 has a first control apparatus 110, a second control apparatus 120, and a third control apparatus 130; these control apparatuses are connected with one another through a vehicle network formed of a communication bus 101. The communication bus 101 is configured, for example, by use of a telecommunication standard such as Ethernet (registered trademark) or CAN (Control Area Network: registered trademark). In Embodiment 1, an example where Ethernet is utilized as the communication bus 101 will be explained.

The first control apparatus 110 is connected with the second control apparatus 120 and the third control apparatus 130 via the communication bus 101. The second control apparatus 120 is connected with the first control apparatus 110 and the third control apparatus 130 via the communication bus 101 and is connected with a sensor 140 via a communication bus 102 similar to the communication bus 101; the output signal of the sensor 140 is inputted to the second control apparatus 120. The sensor 140 is one of various kinds of sensors for controlling a vehicle, such as a vehicle speed sensor, which is an internal sensor, an acceleration sensor, a surrounding monitoring camera, which is an external sensor, a surrounding monitoring radar (a millimeter wave radar, an ultrasound radar, or the like), and a GNSS (Global Navigation Satellite System) as a position sensor.

The third control apparatus 130 is connected with the first control apparatus 110 and the second control apparatus 120 via the communication bus 101 and is connected with a steering control apparatus 150 and a power control apparatus 160 via a communication bus 103 similar to the communication bus 101. The steering control apparatus 150 controls a driving motor and the like of an electric power steering apparatus so that the steering angle follows a determined steering-angle target value. The power control apparatus 160 controls the respective output torque values of power machines such as a motor and an internal combustion engine so that the vehicle speed follows a determined vehicle-speed target value.

Figure 2:
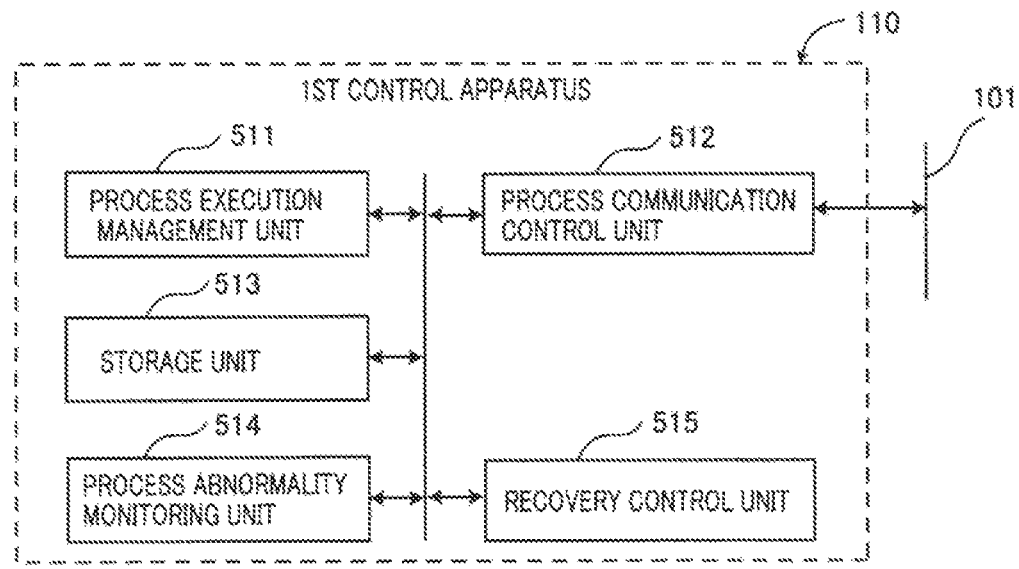
FIG. 2 is a functional configuration diagram representing the functional configuration of a first control apparatus in the control apparatus according to Embodiment 1.
Figure 3:
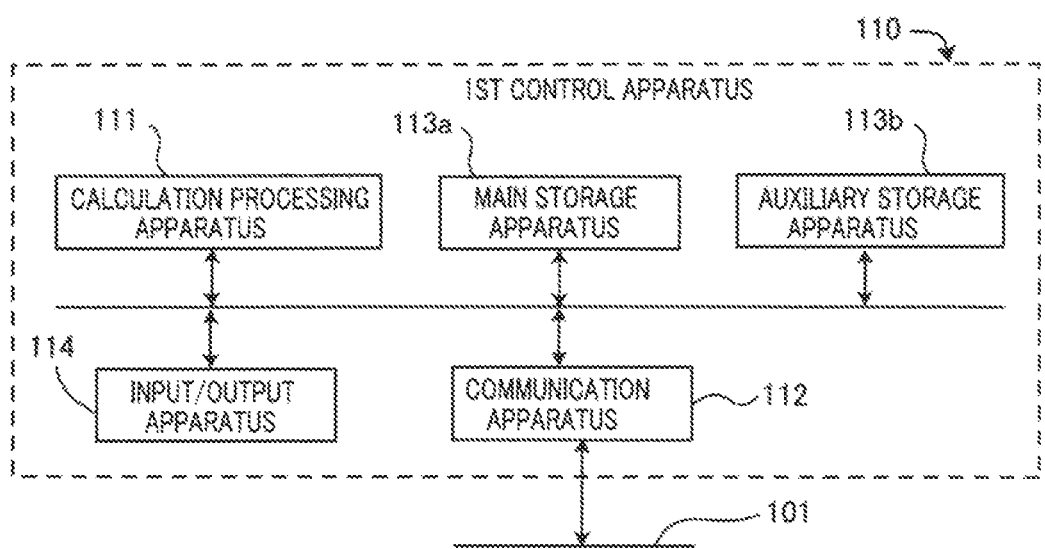
FIG. 3 is a hardware configuration diagram representing the hardware configuration of the first control apparatus in the control apparatus according to Embodiment 1.

Next, the first control apparatus 110 will be explained. FIG. 2 is a functional configuration diagram representing the functional configuration of the first control apparatus in the control apparatus according to Embodiment 1; FIG. 3 is a hardware configuration diagram representing the hardware configuration of the first control apparatus in the control apparatus according to Embodiment 1. As represented in FIG. 2, the first control apparatus 110 includes, as function units, a process execution management unit 511 as a process execution management processor, a process communication control unit 512 as a process communication control processor, a storage unit 513, a process abnormality monitoring unit 514 as a process abnormality monitoring processor, and a recovery control unit 515 as a recovery processor.

The respective functions of the process execution management unit 511, the process communication control unit 512, the storage unit 513, the process abnormality monitoring unit 514, and the recovery control unit 515 in the first control apparatus 110 are realized by processing circuits provided in the first control apparatus 110. For example, as represented in FIG. 3, the first control apparatus 110 includes, as the processing circuits, a calculation processing apparatus 111 such as a CPU (Central Processing Unit), a communication apparatus 112 that communicates with the other control apparatuses through the vehicle network, a main storage apparatus 113a that performs data exchange with the calculation processing apparatus 111, an auxiliary storage apparatus 113b, and an input/output apparatus 114.

As the calculation processing apparatus 111, for example, a DSP (Digital Signal Processor), a GPU (Graphics Processing Unit), a neuro chip, an ASIC (Application Specific Integrated Circuit), an IC (Integrated Circuit), an FPGA (Field Programmable Gate Array), any one of various kinds of logic circuits, or any one of various kinds of signal processing circuits can be utilized. In addition, it may be allowed that as the calculation processing apparatus 111, two or more calculation processing apparatus of the same type or different types are provided, and respective processing items are implemented in a sharing manner.

The communication apparatus 112 performs communication by use of, for example, a telecommunication standard such as Ethernet, as described above. As the main storage apparatus 113a, a memory such as a RAM (Random Access Memory) is utilized; as the auxiliary storage apparatus 113b, a nonvolatile memory such as a ROM (Read Only Memory), an HDD (Hard Disk Drive), or a flash memory is utilized. Data stored in the auxiliary storage apparatus 113b is loaded on the main storage apparatus 113a, as may be necessary, by the calculation processing apparatus 111 and is utilized in processing by the calculation processing apparatus 111. In contrast, data stored in the main storage apparatus 113a is stored in the auxiliary storage apparatus 113b, as may be necessary, through the calculation processing apparatus 111.

The calculation processing apparatus 111 loads software (program) that has been stored in the auxiliary storage apparatus 113b on the main storage apparatus 113a so as to execute processing, and cooperates with the other hardware items such as the communication apparatus 112, the main storage apparatus 113a, and the auxiliary storage apparatus 113b, so that the respective functions of the process execution management unit 511, the process communication control unit 512, the storage unit 513, the process abnormality monitoring unit 514, and the recovery control unit 515 provided in the first control apparatus 110 are realized.

Figure 4:
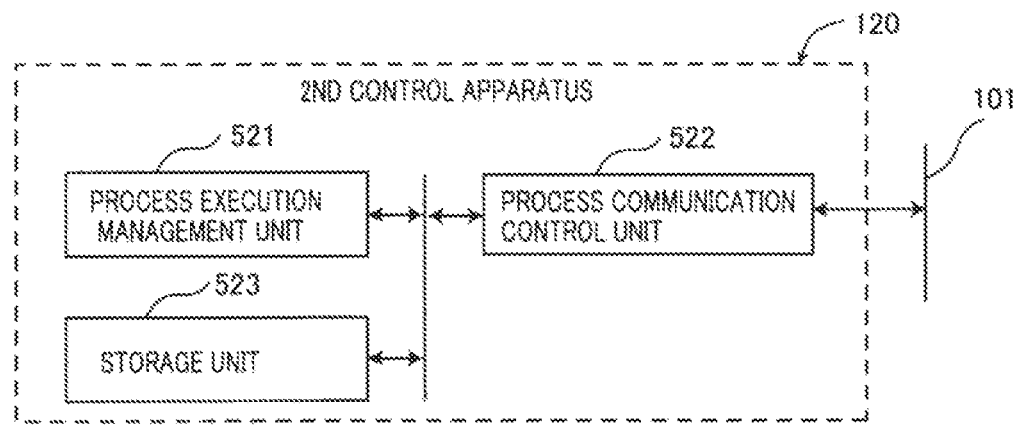
FIG. 4 is a functional configuration diagram representing the functional configuration of a second control apparatus in the control apparatus according to Embodiment 1.
Figure 5:
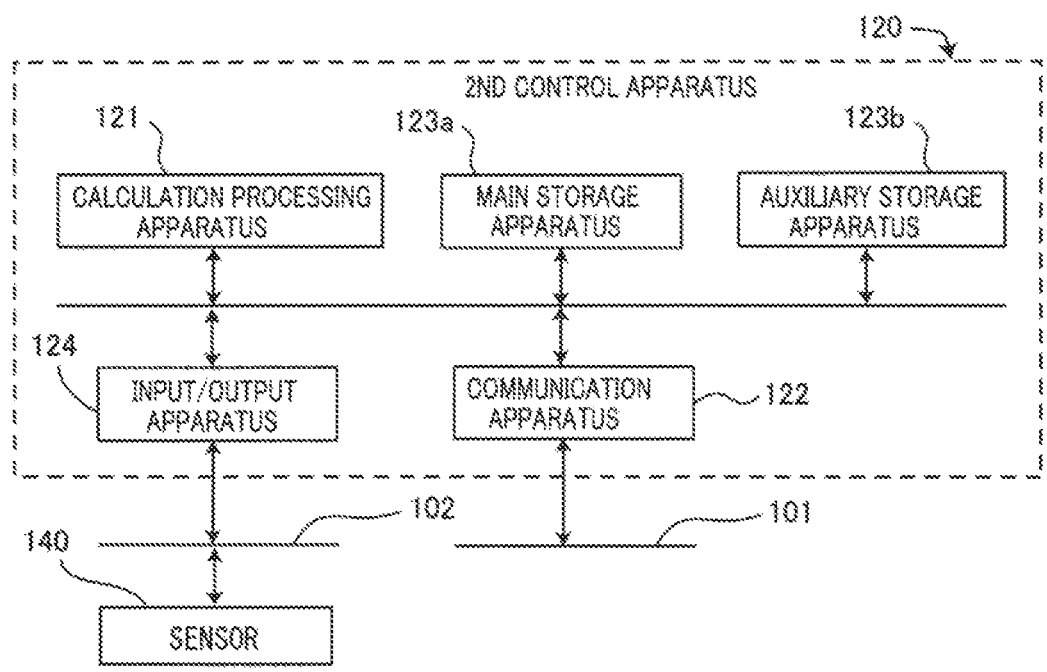
FIG. 5 is a hardware configuration diagram representing the hardware configuration of the second control apparatus in the control apparatus according to Embodiment 1.

Next, the second control apparatus 120 will be explained. FIG. 4 is a functional configuration diagram representing the functional configuration of the second control apparatus in the control apparatus according to Embodiment 1; FIG. 5 is a hardware configuration diagram representing the hardware configuration of the second control apparatus in the control apparatus according to Embodiment 1. As represented in FIG. 4, the second control apparatus 120 includes, as function units, a process execution management unit 521 as a process execution management processor, a process communication control unit 522 as a process communication control processor, and a storage unit 523.

The respective functions of the process execution management unit 521, the process communication control unit 522, and the storage unit 523 in the second control apparatus 120 are realized by processing circuits provided in the second control apparatus 120. For example, as represented in FIG. 5, the second control apparatus 120 includes, as the processing circuits, a calculation processing apparatus 121 such as a CPU, a main storage apparatus 123a, an auxiliary storage apparatus 123b, a communication apparatus 122 that communicates with the other control apparatuses through the communication bus 101, and an input/output apparatus 124 that performs inputting/outputting of signals with the sensor 140. The respective configurations of the processing circuits in the second control apparatus 120 are the same as those of the processing circuits in the first control apparatus 110; therefore, the explanations therefor will be omitted.

In addition, as is the case with the first control apparatus 110, the calculation processing apparatus 121 loads software (program) that has been stored in the auxiliary storage apparatus 123b on the main storage apparatus 123a so as to execute processing, and cooperates with the other hardware items such as the communication apparatus 122, the main storage apparatus 123a, and the auxiliary storage apparatus 123b, so that the respective functions of the process execution management unit 521, the process communication control unit 522, and the storage unit 523 in the second control apparatus 120 are realized.

Figure 6:
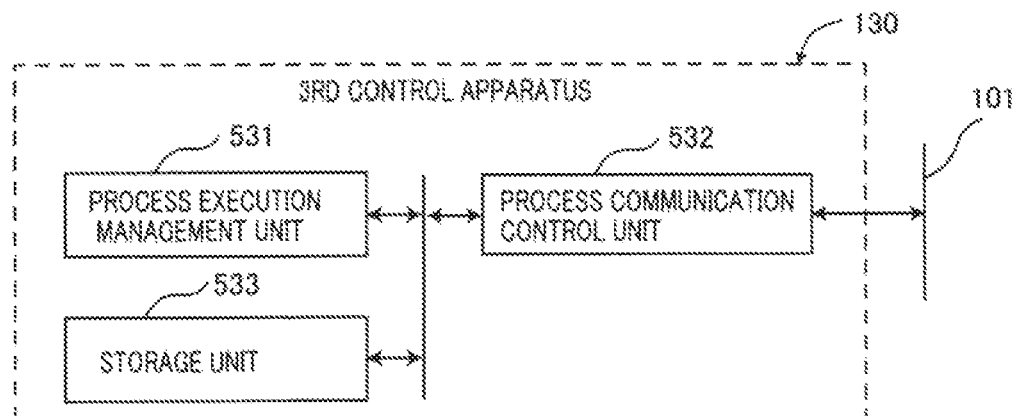
FIG. 6 is a functional configuration diagram representing the functional configuration of a third control apparatus in the control apparatus according to Embodiment 1.
Figure 7:
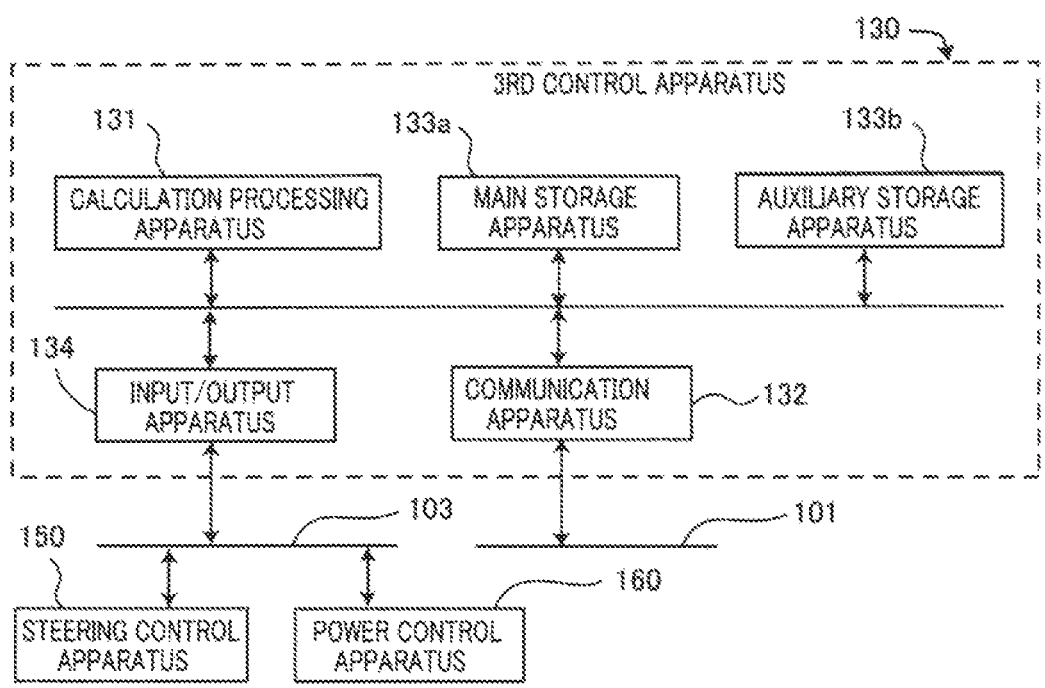
FIG. 7 is a hardware configuration diagram representing the hardware configuration of the third control apparatus in the control apparatus according to Embodiment 1.

Next, the third control apparatus 130 will be explained. FIG. 6 is a functional configuration diagram representing the functional configuration of the third control apparatus in the control apparatus according to Embodiment 1; FIG. 7 is a hardware configuration diagram representing the hardware configuration of the third control apparatus in the control apparatus according to Embodiment 1. As represented in FIG. 6, the third control apparatus 130 includes, as function units, a process execution management unit 531 as a process execution management processor, a process communication control unit 532 as a process communication control processor, and a storage unit 533.

The respective functions of the process execution management unit 531, the process communication control unit 532, and the storage unit 533 in the third control apparatus 130 are realized by processing circuits provided in the third control apparatus 130. For example, as represented in FIG. 7, the third control apparatus 130 includes, as the processing circuits, a calculation processing apparatus 131 such as a CPU, a main storage apparatus 133a, an auxiliary storage apparatus 133b, a communication apparatus 132 that communicates with the other control apparatuses through the communication bus 101, and an input/output apparatus 134 that performs inputting/outputting of signals with the steering control apparatus 150 and the power control apparatus 160. The respective configurations of the processing circuits in the third control apparatus 130 are the same as those of the processing circuits in the first control apparatus 110; therefore, the explanations therefor will be omitted.

In addition, as is the case with the first control apparatus 110, the calculation processing apparatus 131 loads software (program) that has been stored in the auxiliary storage apparatus 133b on the main storage apparatus 133a so as to execute processing, and cooperates with the other hardware items such as the communication apparatus 132, the main storage apparatus 133a, and the auxiliary storage apparatus 133b, so that the respective functions of the process execution management unit 531, the process communication control unit 532, and the storage unit 533 provided in the third control apparatus 130 are realized.

(1-2) Explanation for Two or More Processes with which Control Apparatus Realizes Automatic Driving Control Next, there will be explained a functional configuration for realizing automatic driving control by the foregoing control communication system 100. In the automatic driving control, the surrounding environment of an automobile is recognized by a sensor mounted in the automobile so that an orbit path and a vehicle speed, as the targets, are determined; concurrently, in order to achieve the target values, respective actuators related to the steering angle and the vehicle speed are controlled.

In Embodiment 1, for the sake of simplicity, as the sensor 140 to be connected with the second control apparatus 120, a surrounding monitoring camera is utilized; from image data obtained by the surrounding monitoring camera, the traffic lane ahead of the automobile and another automobile are detected; from these detected information items, the target values of the steering angle and the vehicle speed are calculated; then, the steering control apparatus 150 controls the steering angle and the power control apparatus 160 controls the actuator related to the vehicle speed.

The automatic driving control according to Embodiment 1 is designed based on an SOA (Service Oriented Architecture) to be realized by combining a plurality of software items (programs) each of which realizes discrete processing. In this SOA, for discrete processing (hereinafter, referred to as a process), there are defined an information provider who provides information such as the calculation result of a process to another process and an information user who utilizes information such as the calculation result of another process for a calculation in its own process. In the SOA, in the case where the process of an information provider and the process of an information user exist on a network including the control apparatus and the information to be provided and the information to be used coincide with each other, the communication between the respective processes are established so as to realize data interchange between the processes.

Figure 8:
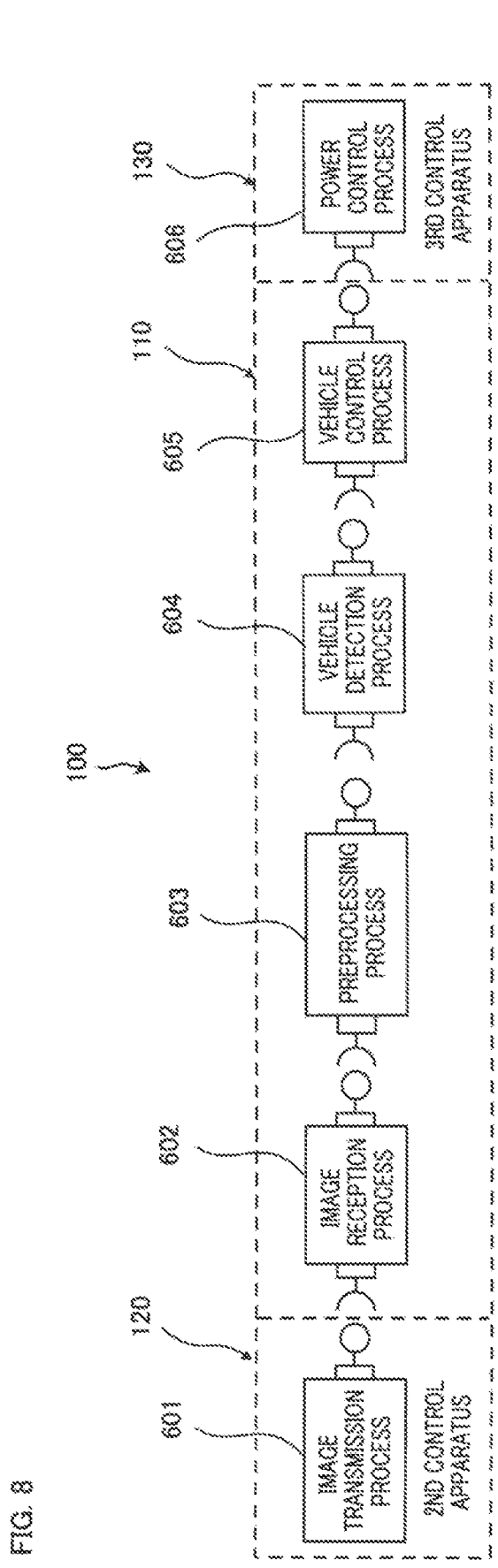
FIG. 8 is an explanatory diagram representing the relative relationships among respective processes in the control apparatus according to Embodiment 1.

FIG. 8 is an explanatory diagram representing the relative relationships among respective processes in the control apparatus according to Embodiment 1. More specifically, FIG. 8 represents the relevance among a plurality of processes for realizing an automatic driving control system by the control communication system 100 designed based on the SOA. As represented in FIG. 8, as described above, the control communication system 100 includes the first control apparatus 110, the second control apparatus 120, and the third control apparatus 130; an image reception process 602, a preprocessing process 603, a vehicle detection process 604, and a vehicle control process 605 are arranged in the first control apparatus 110; an image transmission process 601 is disposed in the second control apparatus 120; a power control process 606 is disposed in the third control apparatus 130.

The image transmission process 601 disposed in the second control apparatus 120 transmits image data taken by the surrounding monitoring camera as the sensor 140 to the image reception process 602, as another process, in the first control apparatus 110. In Embodiment 1, the image reception process 602 is a user of information provided by the image transmission process 601; the image transmission process 601 transmits image data to the image reception process 602 through the communication bus 101.

The image reception process 602 disposed in the first control apparatus 110 receives image data transmitted by the image transmission process 601 as another process. In Embodiment 1, the image reception process 602 utilizes information provided by the image transmission process 601; the image reception process 602 receives image data taken by the surrounding monitoring camera as the sensor 140.

The preprocessing process 603 disposed in the first control apparatus 110 applies image processing for facilitating object detection to image data and then provides processed data obtained through the image processing to another process. In Embodiment 1, the preprocessing process 603 is an information user for the image reception process 602 and an information provider for the vehicle detection process 604; the preprocessing process 603 receives image data, taken by the surrounding monitoring camera as the sensor 140, from the image reception process 602, applies, for example, filtering processing items such as gray-scaling, threshold-value processing, and smoothing to the image data, then provides the processed data to the vehicle detection process 604.

The vehicle detection process 604 disposed in the first control apparatus 110 detects an object appearing in the image data and then provides the features of the detected object to another process. In Embodiment 1, the vehicle detection process 604 is an information user for the preprocessing process 603 and an information provider for the vehicle control process 605; from the processed data provided by the preprocessing process 603, the vehicle detection process 604 detects the traffic lane on which the own vehicle is traveling and a vehicle ahead of the own vehicle and then provides the features thereof, for example, the relative position of the traffic lane with respect to the own vehicle, the position of the vehicle ahead of the own vehicle, and the like to the vehicle control process 605.

The vehicle control process 605 disposed in the first control apparatus 110 calculates the steering-angle target value and the vehicle-speed target value, based on the traffic lane and the positional relationship with the vehicle ahead of the own vehicle. In Embodiment 1, the vehicle control process 605 is an information user for the vehicle detection process 604 and an information provider for the power control process 606; from the relative position of the traffic lane with respect to the own vehicle and the position of the vehicle ahead of the own vehicle, provided by the vehicle detection process 604, the vehicle control process 605 calculates, for example, a deviation amount of the own vehicle from the central position of the traffic lane, sets the steering-angle target value for making the deviation amount become "0" and the vehicle-speed target value in a direction in which the distance between the vehicle ahead of the own vehicle and the own vehicle is kept constant, and then provides these target values to the power control process 606.

The power control process 606 disposed in the third control apparatus 130 obtains the respective target values of the steering angle and the vehicle speed and then controls the driving motor and the like of the electric power steering apparatus provided in the steering control apparatus 150 so that the steering angle follows the obtained steering-angle target value; similarly, the power control process 606 controls the output torque values of the power machines provided in the power control apparatus 160 so that the vehicle speed follows the obtained vehicle-speed target value. In Embodiment 1, the power control process 606 is an information user for the vehicle control process 605; through the communication bus 101, the power control process 606 obtains the respective target values of the steering angle and the vehicle speed from the vehicle control process 605.

Next, respective execution states of the processes will be explained. The execution state is set for each of the processes and is stored in the corresponding auxiliary storage apparatus in each of the first control apparatus 110, the second control apparatus 120, and the third control apparatus 130 in which the respective corresponding processes are arranged. Specifically, the execution state indicating that the process that needs to be preliminarily started so that another process starts has been started is set as a starting condition.

FIG. 9 is an explanatory diagram representing the respective execution states of the processes in the control apparatus according to Embodiment 1. In FIG. 9, an execution state 6011 of the image transmission process 601 provided in the second control apparatus 120, an execution state 6021 of the image reception process 602 provided in the first control apparatus 110, and an execution state 6061 of the power control process 606 provided in the third control apparatus 130 are "non"; thus, these processes can be started without depending on another processes.

In contrast, respective starting conditions are set for an execution state 6031 of the preprocessing process 603, an execution state 6041 of the vehicle detection process 604, and an execution state 6051 of the vehicle control process 605 in the first control apparatus 110. In other words, as the starting condition for the execution state 6031 of the preprocessing process 603, the execution state indicating that "the image reception process 602 has been preliminarily started" is set; as the starting condition for the execution state 6041 of the vehicle detection process 604, the execution state indicating that "the preprocessing process 603 has been preliminarily started" is set; as the starting condition for the execution state 6051 of the vehicle control process 605, the execution state indicating that "the vehicle detection process 604 has been preliminarily started" is set.

Accordingly, the preprocessing process 603 is started when the image reception process 602 has been preliminarily started; the vehicle detection process 604 is started when the preprocessing process 603 has been preliminarily started; the vehicle control process 605 is started when the vehicle detection process 604 has been preliminarily started. Each of the foregoing execution states is applied also after each of the processes is started. For example, in the case where the vehicle detection process 604 terminates, the execution state is applied in such a way that it is prevented that the vehicle control process 605, the starting condition for which is that the vehicle detection process 604 has been started, terminates before the vehicle detection process 604 terminates and hence a discrepancy occurs in the starting condition.

Next, returning to FIGS. 2 and 3, the respective functions of the first control apparatus 110 will be explained. As described above, the first control apparatus 110 includes the function units, i.e., the process execution management unit 511, the process communication control unit 512, the storage unit 513, the process abnormality monitoring unit 514, and the recovery control unit 515. Hereinafter, each of the functions will be explained.

The storage unit 513 as a function unit stores the respective programs related to the processes arranged in the first control apparatus 110 and the execution states of the corresponding processes. Specifically, the storage unit 513 in the first control apparatus 110 stores the respective programs related to the image reception process 602, the preprocessing process 603, the vehicle detection process 604, and the vehicle control process 605 and the respective execution states 6011, 6021, 6031, 6041, and 6051 of these processes.

The auxiliary storage apparatus 113b, which is included in the hardware configuration of the first control apparatus 110, stores the respective programs for the process execution management unit 511, the process communication control unit 512, the process abnormality monitoring unit 515, and the recovery control unit 515. These programs are loaded from the auxiliary storage apparatus 113b onto the main storage apparatus 113a and then are executed by the calculation processing apparatus 111.

The auxiliary storage apparatus 113b stores an OS (Operation System, referred to as an OS, hereinafter). At least part of the OS is loaded on the main storage apparatus 113a and then is executed by the calculation processing apparatus 111. Data to be obtained by executing the program is stored in a storage apparatus such as the main storage apparatus 113a, the auxiliary storage apparatus 113b, a register in the calculation processing apparatus 111, or a cache memory.

The process execution management unit 511 starts the process satisfying the starting condition, based on the respective execution states 6021, 6031, 6041, and 6051 stored in the storage unit 513. In Embodiment 1, the process execution management unit 511 is started by the OS, loads all of the execution states stored in the auxiliary storage apparatus 113b on the main storage apparatus 113a, ascertains the respective starting conditions of the processes, and then starts the process satisfying the starting condition.

At a time of a change in the vehicle state, such as a vehicle stoppage or an engine stoppage, and when receiving a command for terminating a process from the recovery control unit 515, described later, the process execution management unit 511 terminates the started process. In this regard, however, in the case where the process to be terminated is included in the starting condition for another process, the process execution management unit 511 terminates this particular process in the order reverse to that in which this particular process has been started.

The process communication control unit 512 controls interchanging of information items to be dealt with by the started process in the first control apparatus 110. Specifically, in the case where a process that is an information provider exists in the first control apparatus 110, the process notifies a registry provided in the process communication control unit 512 that information can be provided. In the case where a process that is an information user exists in the first control apparatus 110, the process notifies the registry provided in the process communication control unit 512 that use of information is requested. From the information registered in the registry, the process communication control unit 512 transfers, for example, in a broadcasting manner, the other control apparatuses connected with the communication bus 101 that the information provider can provide the information or that the information user requests use of the information Accordingly, respective registries are synchronized with one another among the process communication control unit 512 in the first control apparatus and the respective process communication control units in the other control apparatuses.

When in the foregoing registry, there have been registered an information provider and an information user whose subject information items are one and the same, the process communication control unit 512 establishes a communication path between the respective processes. Then, when the process, which is an information provider, has executed information transmission, the process communication control unit 512 transmits information to the process, which is an information user. In the case where the two processes performing intercommunication are both provided in the first control apparatus 110, the process communication control unit 512 performs transfer of information in the first control apparatus 110.

When receiving, from an information-provider process, notification saying that providing of information is stopped or when receiving, from an information-user process, notification saying that use of information is stopped, the process communication control unit 512 removes the registration of the information provider or the information user and then disconnects the communication path that has been established between the processes.

The process abnormality monitoring unit 514 receives at least one Check Point (hereinafter, referred to as a CP), which is information to be notified when a monitoring subject process—a subject of process abnormality monitoring—has passed through specific processing; when the at least one CP that has been received differs from an abnormality determination table for a predetermined CP-notification time interval, a predetermined notification frequency, predetermined notification order, or the like, the process abnormality monitoring unit 514 determines that the monitoring subject process is abnormal. When determining an abnormality in the monitoring subject process, the process abnormality monitoring unit 514 notifies the recovery control unit 515 of the monitoring subject process having the abnormality, as an abnormal process.

FIG. 10 is an explanatory table for explaining the function of the abnormality monitoring unit in the control apparatus according to Embodiment 1; there is represented an example in which an abnormality determination item related to the image reception process 602 is extracted from the abnormality determination table based on an CP. In FIG. 10, when the monitoring subject process is the image reception process 602, the process abnormality monitoring unit 514 receives at least one CP from the image reception process 602; when the order of the received CPs is different from the notification order of "CP_1", "CP_2", and "CP_3", which is predetermined CP notification order, the process abnormality monitoring unit 514 determines that the image reception process 602 is abnormal.

In addition, in this explanation, there is described an example where the determination whether or not the image reception process 602 is abnormal is performed based on the CP notification order; however, it may be allowed that the determination is performed based on the time interval of CP notification, the notification frequency, or the like. Also in the case where the monitoring subject process is a process other than the image reception process 602, the process abnormality monitoring unit 514 determines the abnormality in such a manner as described above.

Next, in FIG. 2, when receiving information on an abnormal process from the process abnormality monitoring unit 514, the recovery control unit 515 determines whether or not the execution state of the abnormal process is included in the starting conditions of the other processes, based on the loaded execution states. In the case where the execution state of the abnormal process is included in the starting conditions of the other processes, the recovery control unit 515 issues to the process execution management unit 511 an instruction of temporarily stopping all the processing items to be performed by the other processes; after all of the other processes are temporarily stopped, the recovery control unit 515 issues to the process execution management unit 511 an instruction of restarting the abnormal process. After the abnormal process restarts as a normal process, the recovery control unit 515 issues to the process execution management unit 511 an instruction of resuming all of the processes that have temporarily been stopped. In the case where the execution state of the abnormal process is not included in the starting conditions of the other processes, the recovery control unit 515 issues to the process execution management unit 511 an instruction of restarting the abnormal process.

Here, there will be explained the respective processing items for [starting] of a process, [terminating] of a process, [restarting] of a process, [temporarily stopping] of a process, and [resuming] of a process. [Starting] of a process signifies that the memory area for the process to be started is secured and that the process is produced and the process is initialized. [Terminating] of a process signifies that storage and communication to be dealt with by a process to be terminated is stopped and that the process to be terminated is deleted so as to release the memory area of the process. [Restarting] of a process signifies that [terminating] of a process and [starting] of a process are executed.

[Temporarily stopping] of a process signifies that the processing of a process being executed is temporarily stopped; the foregoing operation that the storage and communication to be dealt with by a process to be terminated is stopped and that the process to be terminated is deleted so as to release the memory area of the process is not performed. [Resuming] of a process signifies that in a process that has been stopped by the foregoing [temporarily stopping] of a process, the processing is restarted from the point at which the process has been temporarily stopped.

The respective functions of the process execution management unit 521, the process communication control unit 522, and the storage unit 523 in the second control apparatus 120 represented in FIG. 4 are the same as the respective functions of the process execution management unit 511, the process communication control unit 512, and the storage unit 513 in the first control apparatus 110; the respective functions of the process execution management unit 531, the process communication control unit 532, and the storage unit 533 in the third control apparatus 130 represented in FIG. 6 are the same as the respective functions of the process execution management unit 511, the process communication control unit 512, and the storage unit 513 in the first control apparatus 110; therefore, the explanations therefor will be omitted.

(1-3) Explanation for Operation

At first, the operation of automatic driving control performed by each of the control apparatuses at a normal time will be explained. When the power source of the vehicle is turned on, the OS stored in the auxiliary storage apparatus 113b in the first control apparatus 110 is loaded on the main storage apparatus 113a and is executed by the calculation processing apparatus 111. When the OS is executed, the OS loads the program for the process execution management unit 511, stored in the auxiliary storage apparatus 113b, on the main storage apparatus 113a and then starts execution of the program, as a process managed by the OS. Next, process execution management unit 511 loads the program for the process communication control unit 512, stored in the auxiliary storage apparatus 113b, on the main storage apparatus 113a and then starts the process communication control unit 512.

Similarly, the process execution management unit 511 loads the program for the process abnormality monitoring unit 514, stored in the auxiliary storage apparatus 113b, on the main storage apparatus 113a and then starts the process abnormality monitoring unit 514. Moreover, the process execution management unit 511 loads the program for the recovery control unit 515, stored in the auxiliary storage apparatus 113b, on the main storage apparatus 113a and then starts the recovery control unit 515.

Also in the case of the second control apparatus 120 and the third control apparatus 130, the OS is started in each of the control apparatuses in a manner the same as that in which the foregoing first control apparatus 110 is started; after that, the process execution management unit 521 or 531 and the process communication control unit 522 or 532, as the case may be, are started.

Figure 11:
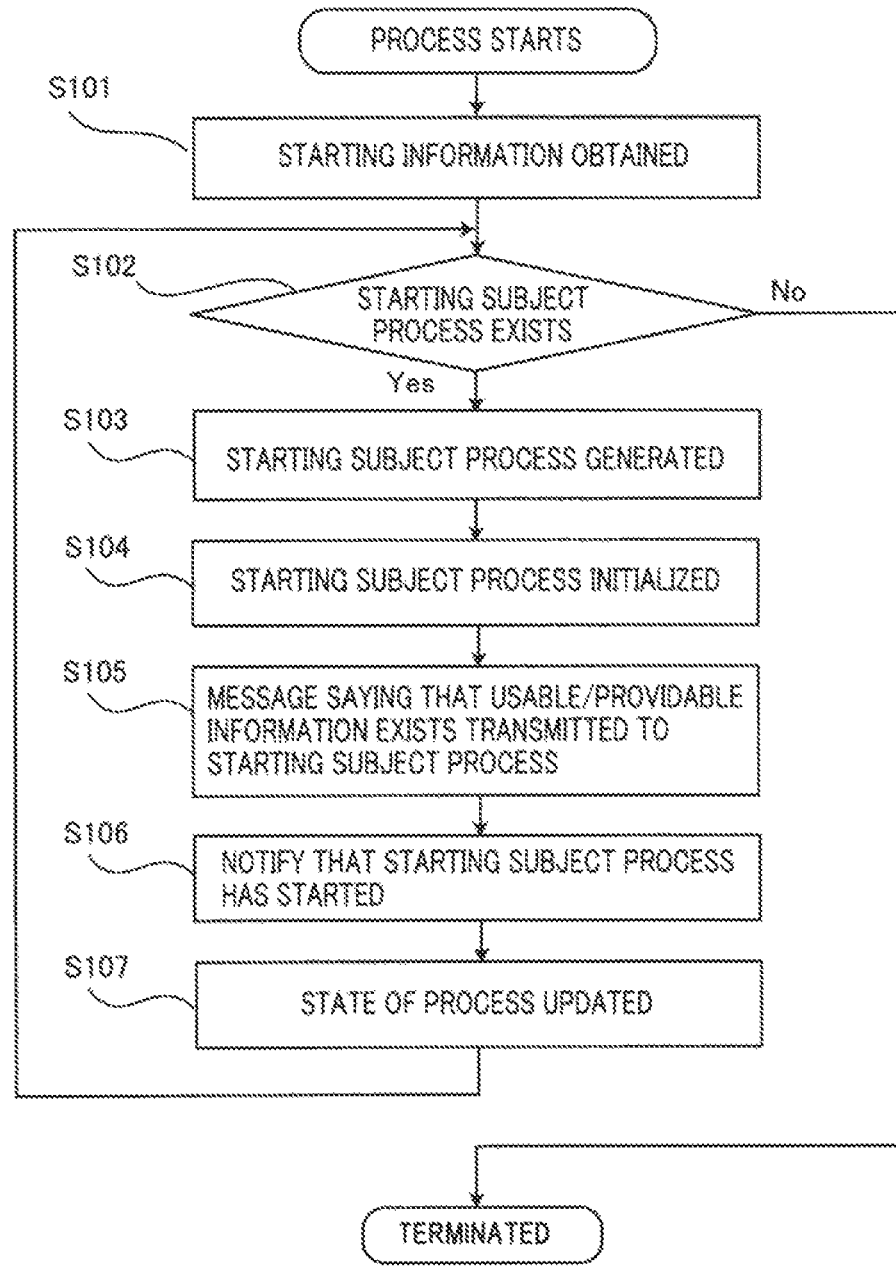
FIG. 11 is a flowchart representing the operation of a recovery control unit in the control apparatus according to Embodiment 1.

Here, starting of a process will be explained. In the following description, the explanation will be made by use of the processes in the first control apparatus 110. FIG. 11 is a flowchart representing the operation of the recovery control unit in the control apparatus according to Embodiment 1. FIGS. 12A, 12B, 12C, 12D, 12E, and 12F are a set of explanatory tables representing starting management tables of the process execution management unit in the control apparatus according to Embodiment 1; specifically, the operation of the process execution management unit 511 in the first control apparatus 110 is represented; FIGS. 12A, 12B, 12C, and 12D represent the respective states of the processes at different stages. In the [process] column in each of FIGS. 12A, 12B, 12C, and 12D are, [image reception process], [preprocessing process], vehicle detection process], and [vehicle control process] are sequentially described from the topmost section; for each of the processes, [whether or not the starting condition exists], [the process that is to become the starting condition], and [the state of the process] are described.

In FIG. 11, in the step S101, the process execution management unit 511 loads all of the execution states stored in the auxiliary storage apparatus 113b on the main storage apparatus 113a. Then, from all of the execution states loaded on the main storage apparatus 113a, the process execution management unit 511 makes a list of whether or not any starting condition exists in each of the processes, the starting condition when exists, and the present state of each of the processes.

FIG. 12A is a starting management table in which there are summarized the processes arranged in the first control apparatus 110 at a time immediately after the foregoing processing, whether or not any starting condition exists in each of the processes, the process to become a starting condition, and the present state of each of the processes. In Embodiment 1, because its starting condition is "none", the image reception process 602 can be started without any condition. The execution state of the image reception process 602 is set as the starting condition of the preprocessing process 603; the execution state of the preprocessing process 603 is set as the starting condition of the vehicle detection process 604; the execution state of the vehicle detection process 604 is set as the starting condition of the vehicle control process 605. Accordingly, the preprocessing process 603, the vehicle detection process 604, and the vehicle control process 605 are started by the process execution management unit 511 when the respective starting conditions thereof are satisfied.

Returning to FIG. 11, in the step S102, the process execution management unit 511 determines the starting subject process, which is a startable process, based on the starting management table that has been obtained in the step S101 and is represented in foregoing FIG. 12A. As a result, in Embodiment 1, the process execution management unit 511 determines that the image reception process 602 having no starting condition should be the starting subject process (Yes), the step S102 is followed by the step S103. In the case where all of the processes have been started or there exists no process corresponding to the starting condition (No), the process execution management unit 511 terminates the process starting processing.

In the step S103, the process execution management unit 511 secures a memory area for the starting subject process determined in the step S102 and then generates the starting subject process; then, the step S103 is followed by the step S104. In Embodiment 1, the process execution management unit 511 firstly secures a memory area for the image reception process 602 and then generates the image reception process 602. Moreover, the process execution management unit 511 updates the present state of the process in the foregoing starting management table from "unstarted" to "initialized"; then, the step S103 is followed by the step S104. Specifically, in the step S103, the process execution management unit 511 updates the state of the image reception process 602 from "unstarted" to "initialized", as represented in FIG. 12B; then, the step S103 is followed by the step S104.

In the step S104, the starting subject process generated by the process execution management unit 511 in the step S103 executes initialization processing. Specifically, data that is stored in the auxiliary storage apparatus 113b and is to be dealt with by the starting subject process is read. When the starting subject process is an information provider, the process communication control unit 512 is notified that information can be provided, and when the starting subject process is an information user, the process communication control unit 512 is notified that use of information is requested, so that the starting subject process is registered, as an information provider or an information user, in the registry of the process communication control unit 512. In Embodiment 1, because the image reception process 602 is an information provider and an information user, the image reception process 602 is registered, as an information provider and an information user, in the registry of the process communication control unit 512.

In the step S105, in the case where in the registry of the process communication control unit 512, there exists registered information indicating that the starting subject process is an information provider, the process communication control unit 512 transmits a message saying that providable information exists to the second control apparatus 120 and the third control apparatus 130 through, for example, a multicast system; in the case where the starting subject process is an information user, the process communication control unit 512 transmits a message saying that use of information is requested to the second control apparatus 120 and the third control apparatus 130 through, for example, the multicast system.

These messages transmitted from the first control apparatus 110 to the second control apparatus 120 and the third control apparatus 130 are transmitted in a predetermined period, unless the starting subject process issues a request of stopping the transmission, so that it can be confirmed that an information provider or an information user exists. In Embodiment 1, because the image reception process 602 is registered, as an information provider and an information user, in the registry of the process communication control unit 512, the process communication control unit 512 transmits to the second control apparatus 120 and the third control apparatus 130 respective messages saying that the image reception process 602 can provide information and that the image reception process 602 requests use of information.

Next, in the step S106, after completion of its own initialization processing, the starting subject process notifies the process execution management unit 511 that the process has been started. Specifically, the image reception process 602 notifies the process execution management unit 511 that the process has been started.

In the step S107, when receiving from the starting subject process the notification saying that the process has been started, the process execution management unit 511 updates the present state of the process in the foregoing starting management table from "initialized" to "under execution"; then, the step S102 is resumed. Specifically, the process execution management unit 511 updates the state of the image reception process 602 from "initialized" to "under execution", as represented in FIG. 12C.

Next, the step S107 is followed by the step S102, where the process execution management unit 511 determines the next starting subject process. In Embodiment 1, because in the step S107, the image reception process 602 has been started and then the starting management table has been updated, the preprocessing process 603 whose starting condition is the execution state of the image reception process 602 becomes startable; therefore, the process execution management unit 511 determines that the preprocessing process 603 should be the starting subject process.

Because processing items in the steps S103 through S107 are the same as the foregoing processing items, the explanations therefor will be omitted. In Embodiment 1, when the process starting of the preprocessing process 603 is completed, the vehicle detection process 604 becomes the starting subject; when the process starting of the vehicle detection process 604 is completed, the vehicle control process 605 becomes the starting subject; then, the vehicle control process 605 is started, so that all of the processes arranged in the first control apparatus are started.

Similarly, the process starting processing from the step S101 through the step S107 in FIG. 11 is performed also in each of the second control apparatus 120 and the third control apparatus 130. As represented in foregoing FIG. 9, the starting condition in the execution state 6011 of the image transmission process 601 disposed in the second control apparatus 120 is "none", and the starting condition in the execution state 6061 of the power control process 606 disposed in the third control apparatus 130 is "none"; therefore, the image transmission process 601 disposed in the second control apparatus 120 and the power control process 606 disposed in the third control apparatus 130 are started regardless of the states of the other processes.

Next, there will be explained the operation, represented in the step S105 in FIG. 11, at a time after the process communication control unit transmits an information provider's message saying that providable information exists and an information user's message saying that use of information is requested. When in the foregoing registry, there have been registered an information provider and an information user whose subject information items are one and the same, the process communication control unit establishes a communication path between the respective processes. Then, when the process, which is an information provider, has executed information transmission, the process communication control unit transmits information to the process, which is an information user. Specifically, the image reception process 602 in the first control apparatus 110 receives image data from the image transmission process and then transmits the received image data to the preprocessing process 603. In the case where the two processes performing intercommunication are both provided in the first control apparatus 110, the process communication control unit 512 performs transfer of information in the first control apparatus 110.

(1-4) Explanation for Process Terminating

Figure 13:
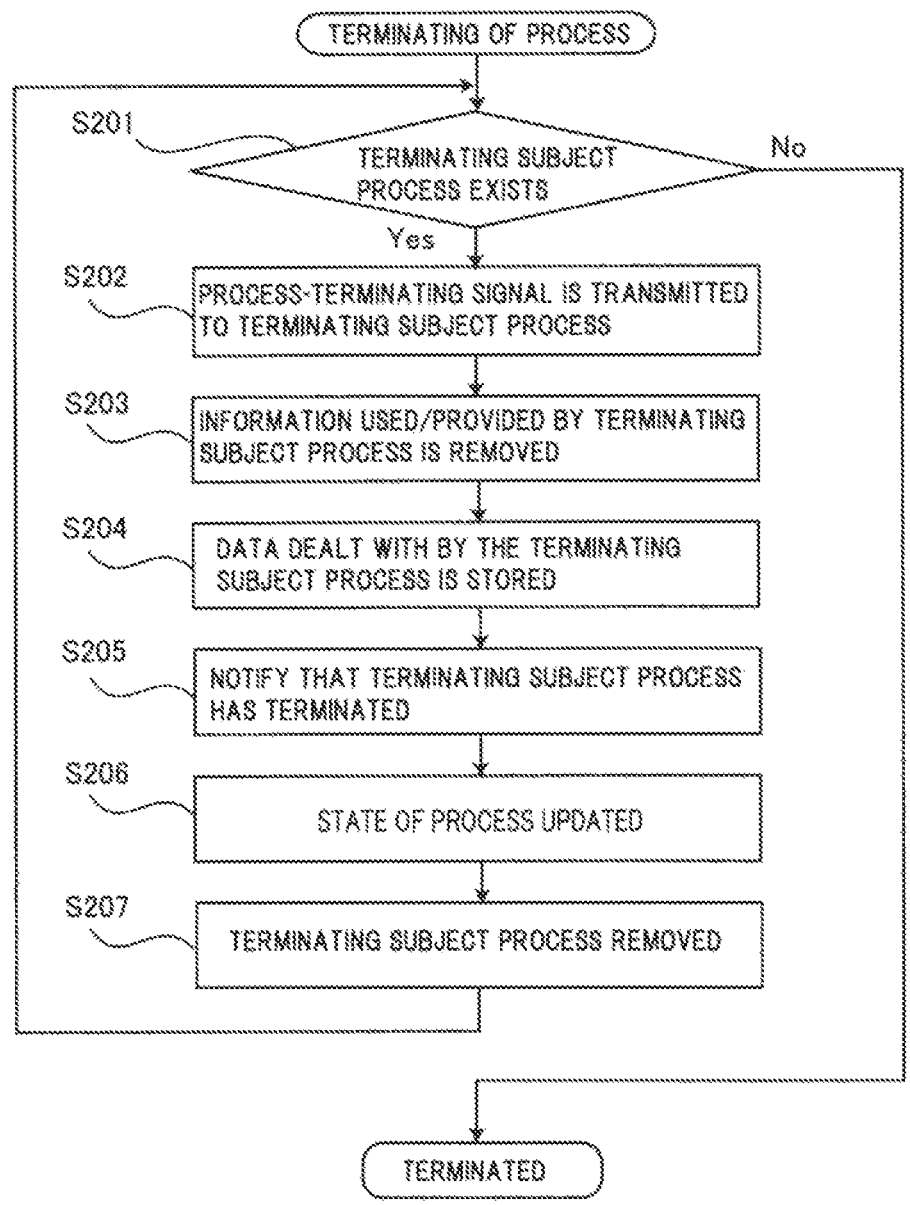
FIG. 13 is a flowchart representing process terminating operation in the control apparatus according to Embodiment 1.

Next, the flow of process-terminating processing will be explained. Process terminating is executed when the process execution management unit 511 issues an instruction of stopping to the process to be terminated or when the process itself terminates the process. In the following explanation, the flow of process terminating will be explained with an example where no request for an automatic driving function exists. FIG. 13 is a flowchart representing process terminating operation in the control apparatus according to Embodiment 1.

In FIG. 13, in the step S201, when a request for process terminating exists (Yes), the process execution management unit 511 of the first control apparatus 110 determines an terminating subject process whose specific process is to be terminated; then, the step S201 is followed by the step S202. In the case where no terminating subject process exists (No), the process execution management unit 511 terminates the process-terminating processing. Specifically, because no request for automatic driving exists, the process execution management unit 511 determines that the image reception process 602, the preprocessing process 603, the vehicle detection process 604, and the vehicle control process 605 should be terminated.

In this regard, however, as represented in the starting management tables in foregoing FIGS. 12A, 12B, 12C, 12D, 12E, and 12F, the vehicle control process 605 cannot be started unless the vehicle detection process 604 is under execution; the vehicle detection process 604 cannot be started unless the preprocessing process 603 is under execution; the preprocessing process 603 cannot be started unless the image reception process 602 is under execution. Therefore, the process execution management unit 511 determines the terminating subject processes in such a way as to terminate the processes in the reverse order to that for having started the processes, i.e., the vehicle control process 605 is determined to be the first terminating subject process.

Moreover, in the step S202, the process execution management unit 511 transmits a process-terminating signal to the terminating subject process. Specifically, the process execution management unit 511 transmits the process-terminating signal to the vehicle control process 605.

Next, in the step S203, after receiving the process-terminating signal transmitted by the process execution management unit 511, the terminating subject process starts the process-terminating processing. In the case where the terminating subject process is an information provider and/or an information user, the terminating subject process notifies the process communication control unit 512 that the respective registrations of the information provider and/or the information user of the terminating subject process should be removed; then, the process communication control unit 512 removes the registration of the terminating subject process, registered in the registry of the process communication control unit 512.

Accordingly, transmission of the message saying that the terminating subject process is an information provider and the message saying that the terminating subject process is an information user, which have been being transmitted to the second control apparatus 120 and the third control apparatus 130, is stopped. In Embodiment 1, the registration of the vehicle control process 605 is removed; then, transmission of the message saying that the vehicle control process 605 is an information provider and the message saying that the vehicle control process 605 is an information user, which have been being transmitted to the second control apparatus 120 and the third control apparatus 130, is stopped. As a result, communication with the vehicle detection process 604 and the power control process 606 is disconnected.

In the step S204, the terminating subject process stores data to be dealt with by the terminating subject process. Specifically, in the storage unit 513, data expanded in the main storage apparatus 113a is stored in the auxiliary storage apparatus 113b by the vehicle control process 605.

In the step S205, when data-storing processing in the preceding step S204 is completed, the terminating subject process notifies the process execution management unit 511 that the process-terminating processing has been completed. Specifically, the vehicle control process 605 notifies the process execution management unit 511 that the process-terminating processing has been completed.

In the step S206, when receiving from the terminating subject process the notification saying that the process-terminating processing has been completed, the process execution management unit 511 updates the state of the terminating subject process in the foregoing list from "under execution" to "terminated"; then, the step S206 is followed by the step S207. Specifically, the process execution management unit 511 updates the state of the vehicle control process 605 from "under execution" to "terminated", as represented in FIG. 12D.

In the step S207 in FIG. 13, the process execution management unit 511 releases the memory area secured for the terminating subject process whose state has been updated from "under execution" to "terminated", and then deletes the terminating subject process. After that, the step S201 is resumed. Specifically, the process execution management unit 511 releases the memory area secured for the vehicle control process 605 and then deletes the vehicle control process 605. Accordingly, the terminating processing for the vehicle control process 605 is completed.

Returning to the step S201, the process execution management unit 511 determines whether or not the next terminating subject process exists. In Embodiment 1, because in the preceding step S207, the vehicle control process 605 included in the starting condition of the vehicle detection process 604 has been completed, it is possible to terminate the vehicle detection process 604; thus, the process execution management unit 511 determines that the vehicle detection process 604 should be the terminating subject process.

Because processing items in the steps S202 through S207 are the same as the foregoing processing items, the explanations therefor will be omitted. In Embodiment 1, when the process-terminating processing for the vehicle detection process 604 is completed, the preprocessing process 603 becomes the terminating subject process; when the process-terminating processing for the preprocessing process 603 is completed, the image reception process 602 becomes the terminating subject process; then, the image reception process 602 is terminated, so that all of the processes that are related to the automatic driving and are arranged in the first control apparatus 110 terminate.

The process-terminating processing from the step S201 through the step S207 in FIG. 13 is performed also in each of the second control apparatus 120 and the third control apparatus 130, so that the image transmission process 601 disposed in the second control apparatus 120 is terminated and the power control process 606 disposed in the third control apparatus 130 is terminated.

(1-5) Explanation for Process Restarting

Figure 14:
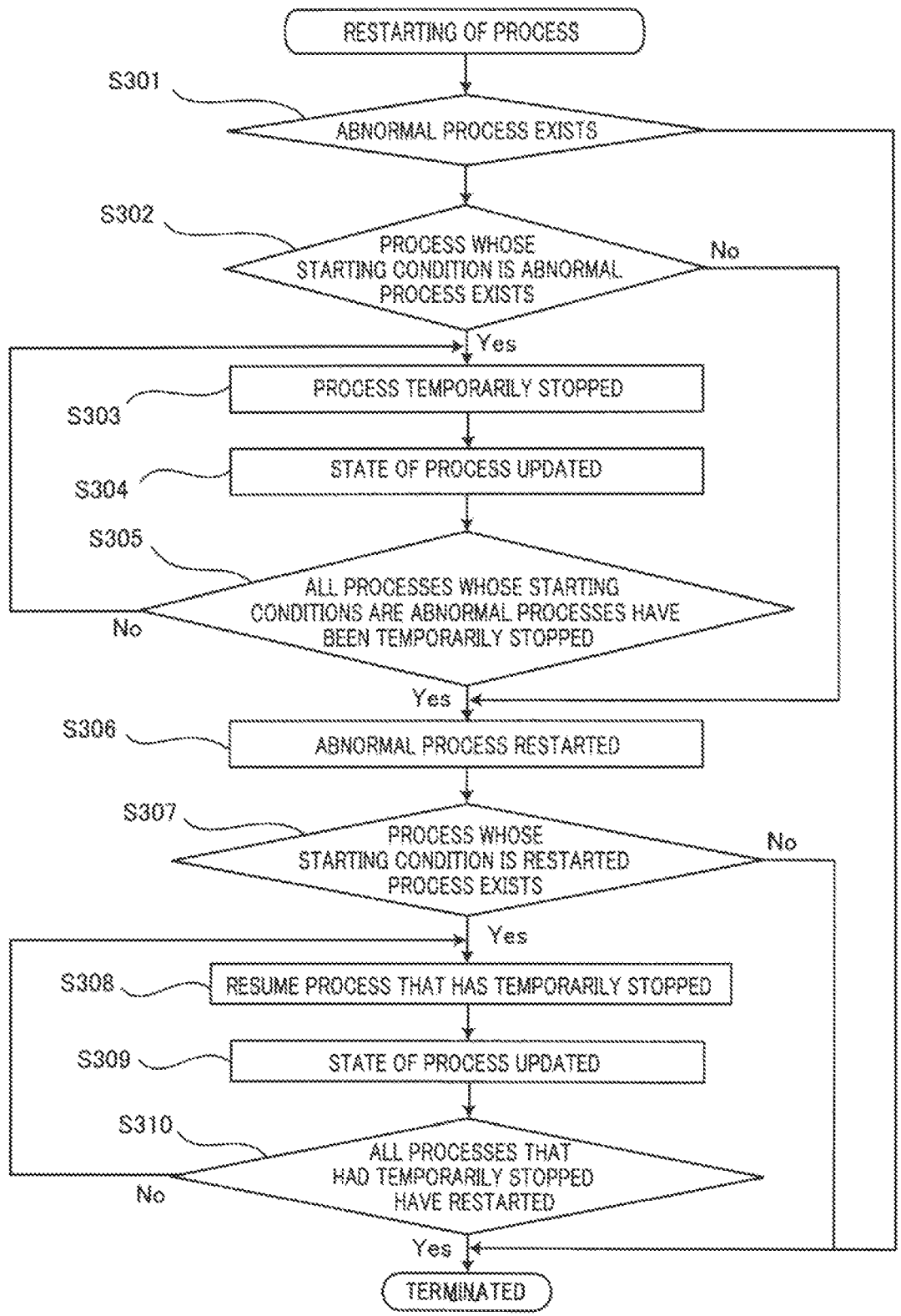
FIG. 14 is a flowchart representing process-restarting operation in the control apparatus according to Embodiment 1.

Next, the flow of process-restarting processing will be explained. FIG. 14 is a flowchart representing process-restarting operation in the control apparatus according to Embodiment 1. In FIG. 14, in the step S301, the process abnormality monitoring unit 514 ascertains whether or not any abnormality exists in the monitoring subject process; when detecting an abnormality in the monitoring subject process, the process abnormality monitoring unit 514 notifies the recovery control unit 515 that an abnormality has occurred in the monitoring subject process. In the case where an abnormality in the monitoring subject process is detected in the step S301 (Yes), the step S301 is followed by the step S302; in the case where no abnormality in the monitoring subject process is detected (No), the process-restarting processing is terminated.

Specifically, in the step S302, after executing specific processing, the image reception process 602, as the monitoring subject process, notifies the process abnormality monitoring unit 514 of the CP corresponding to the processing. The process abnormality monitoring unit 514 accumulates CP notifications from the image reception process 602, as the monitoring subject process, and then compares the CP notifications with the abnormality determination table; in the case where the CP reception order is different from that in the abnormality determination table, the process abnormality monitoring unit 514 determines that the image reception process 602, as the monitoring subject process, is an abnormal process; in the case where the CP reception order coincides with that in the abnormality determination table, the process abnormality monitoring unit 514 determines that the image reception process 602, as the monitoring subject process, is normal.

In the step S302, from the starting management table, the recovery control unit 515 determines whether or not there exists a process whose starting condition is the execution state of the abnormal process. In the case where there exists a process whose starting condition is the execution state of the abnormal process (Yes), the step S302 is followed by the step S303; in the case where there exists no process whose starting condition is the execution state of the abnormal process (No), the step S302 is followed by the step S306. Specifically, in the image reception process 602, as the monitoring subject process, there exists the preprocessing process 603 whose starting condition is the execution state of the image reception process 602; there exists the vehicle detection process 604 whose starting condition is the execution state of the preprocessing process 603; there exists the vehicle control process 605 whose starting condition is the execution state of the vehicle detection process 604. Therefore, the step S302 is followed by the step S303.

In the step S303, the recovery control unit 515 issues to the process execution management unit 511 an instruction of temporarily stopping a process whose starting condition is the execution state of the abnormal process. Then, in accordance with the instruction, the process execution management unit 511 temporarily stops execution of processing of a process whose starting condition is the execution state of the abnormal process. Specifically, in the step S302, it has been determined that there exists the preprocessing process 603 whose starting condition is the execution state of the image reception process 602, that there exists the vehicle detection process 604 whose starting condition is the execution state of the preprocessing process 603, and that there exists the vehicle control process 605 whose starting condition is the execution state of the vehicle detection process 604; the recovery control unit 515 issues to the process execution management unit 511 an instruction of temporarily stopping the vehicle control process 605, among the foregoing processes, the execution state of which is not included in the starting conditions of the other processes.

Based on the instruction from the recovery control unit 515, the process execution management unit 511 stops the processing by the vehicle control process 605. In this situation, the vehicle control process 605 stops only the processing; release of the memory area for the process, data storage, and removal of the registrations of the information provider and the information user are not implemented.

Next, in the step S304, the state of the process, in the foregoing starting management table, that has been temporarily stopped in the step S303 is updated by the process execution management unit 511, from "under execution" to "temporarily stopped"; then, the step S304 is followed by the step S305. Specifically, the process execution management unit 511 updates the state of the vehicle control process 605 from "under execution" to "temporarily stopped". FIG. 12E represents the starting management table at that time.

Returning to FIG. 14, in the step S305, in the case where all of the processes whose starting conditions are the execution state of the abnormal process have been temporarily stopped (Yes), the recovery control unit 515 advances to the step S306; in the case where all of the processes have not been temporarily stopped (No), the recovery control unit 515 returns to the step S303. Specifically, because the vehicle detection process 604 and the preprocessing process 603 are under execution, the recovery control unit 515 returns to the step S303 and then executes the step S303 and the step S304 for each of the vehicle detection process 604 and the preprocessing process 603, in that order, as is the case with the vehicle control process 605. Then, when the state of each of the vehicle control process 605, the vehicle detection process 604, and the preprocessing process 603 becomes "temporarily stopped", the step S305 is followed by the step S306.

In the step S306, the process execution management unit 511 performs restarting in order to execute both terminating and starting of the abnormal process. In the restarting in the step S306, after terminating processing of the abnormal process is executed, the abnormal process is started again so as to be executed as a normal process. This process terminating is the same as the process-terminating processing represented in the step S202 through the step S207 in foregoing FIG. 13; this process starting is the same as the process-starting processing represented in the step S103 through the step S107 in foregoing FIG. 11.

Specifically, the process execution management unit 511 temporarily stops the image reception process 602, which is an abnormal process, and then starts the image reception process 602 again. At this time, in order to temporarily stop the process, the registrations of the information provider and the information user of the image reception process 602 are removed from the registry of the process communication control unit 512. Accordingly, the respective communication paths between the image transmission process 601 and the image reception process 602 and between the image reception process 602 and the preprocessing process 603 are temporarily disconnected; when the image reception process 602 has been started again, the communication paths are also established again.

Returning to FIG. 14, the explanation for the restarting flow will be continued. In the step S302, the recovery control unit 515 ascertains whether or not there exists a process whose starting condition is the execution state of the restarted process. In the case where there exists a process whose starting condition is the execution state of the restarted process (Yes), the step S307 is followed by the step S308; in the case where there exists no process whose starting condition is the execution state of the restarted process (No), the restarting processing is terminated. Specifically, the recovery control unit 515 determines that there exists preprocessing process 603 whose starting condition is the execution state of the image reception process 602.

In the step S308, the recovery control unit 515 issues to the process execution management unit 511 an instruction of resuming the execution of the process that has temporarily been stopped; then, the process execution management unit 511 transmits a process-resuming signal to the process that has temporarily been stopped. When receiving the process-resuming signal form the process execution management unit 511, the process that has been temporarily stopped resumes the processing from a point where the processing has temporarily been stopped. Specifically, the process execution management unit 511 transmits the process-resuming signal to the preprocessing process 603; then, the preprocessing process 603 resumes the processing.

Next, in the step S309, the process execution management unit 511 updates the state of the process that has resumed the processing from "temporarily stopped" to "under execution". Specifically, the process execution management unit 511 updates the state of the preprocessing process 603 from "temporarily stopped" to "under execution", as represented in FIG. 12F.

In the step S310, the recovery control unit 515 ascertains whether or not all of the processes that had temporarily been stopped due to an abnormal process have been resumed; in the case where all of the processes that had temporarily been stopped have been resumed (Yes), the recovery control unit 515 terminates the restarting processing; in the case where all of the processes that had temporarily been stopped have not been resumed (No), the recovery control unit 515 returns to the step S308 and then resumes the remaining processes. Specifically, because the vehicle detection process 604 and the vehicle control process 605 are "temporarily stopped", the recovery control unit 515 returns to the step S308 and then executes the step S308 and the step S309 for each of the vehicle detection process 604 and the vehicle control process 605, in that order, as is the case with the preprocessing process 603. When the state of each of the preprocessing process 603, the vehicle detection process 604, the vehicle control process 605 becomes "under execution", the restarting processing is terminated.

<Effect of Control Apparatus According to Embodiment 1>

As described above, a control apparatus according to Embodiment 1 is provided with a recovery control unit that detects a process whose starting condition is the execution state of a process in which an abnormality has occurred, at a time when the abnormality occurs in any one of processes arranged in a first control apparatus through a third control apparatus and the process in which the abnormality has occurred is restarted, and a process execution management unit that receives an instruction from the recovery control unit and then temporarily stops the process whose starting condition is the execution state of the process in which the abnormality has occurred. As a result, in the case where an abnormality occurs in any of the processes arranged in the respective control apparatuses and the process where the abnormality has occurred is restarted, only the process where the abnormality has occurred is restarted, without restarting all of the process where the abnormality has occurred and the processes each of the starting conditions of which is the execution state of the process where the abnormality has occurred, and the execution of the processes each of the starting conditions of which is the execution state of the process where the abnormality has occurred is temporarily stopped, so that the time period from a time point when an abnormality occurs in a process to a time point when the system is restored can be shortened.

Embodiment 2

Next, a control apparatus according to Embodiment 2 will be explained. In the explanation for Embodiment 2, the difference from Embodiment 1 will mainly be explained. In foregoing Embodiment 1, the respective functions of the process abnormality monitoring unit 514, the recovery control unit 515, and the process execution management unit 511 are in a serial relationship at a time when an abnormality occurs in a process; however, in Embodiment 2, the control apparatus is configured in such a way that the recovery control unit 515 and the process execution management unit 511 are in a parallel relationship.

(2-1) Explanation for Configuration

The configurations and the functions of the control communication system 100, the first control apparatus 110, the second control apparatus 120, and the third control apparatus 130, as the control apparatus according to Embodiment 2, are the same as those of the control apparatus according to Embodiment 1 represented in FIGS. 1 through 7.

With regard to the respective functions of the first control apparatus 110 represented in FIG. 2, the difference from Embodiment 1 will be explained. The difference from Embodiment 1 lies in each of the process execution management unit 511, the process abnormality monitoring unit 514, and the recovery control unit 515. In Embodiment 2, when restarting a process, the process execution management unit 511 checks a flag indicating that there exists a process whose starting condition is the execution state of an abnormal process and that is controlled by the recovery control unit 515; when the flag is lowered, the process execution management unit 511 restarts the abnormal process.

In Embodiment 1, when detecting an abnormality in a process, the process abnormality monitoring unit 514 notifies the recovery control unit 515 of the abnormality in the process; however, in Embodiment 2, when detecting an abnormality in a process, the process abnormality monitoring unit 514 notifies not only the recovery control unit 515 but also the process execution management unit 511 of the abnormality in the process.

In Embodiment 2, when there exists a process whose starting condition is the execution state of an abnormal process, the recovery control unit 515 raises a relevant flag, while temporarily stopping processing of the process whose starting condition is the execution state of the abnormal process. After temporarily stopping the process whose starting condition is the execution state of the abnormal process, the recovery control unit 515 lowers the flag; when the process execution management unit 511 detects the restarting of the abnormal process, the recovery control unit 515 raises the flag again and then resumes the processing of the process whose starting condition is the execution state of the abnormal process and that has temporarily been stopped. At this time, the flag is lowered.

(2-2) Explanation for Operation

Explanation for Process Restarting

Figure 15:
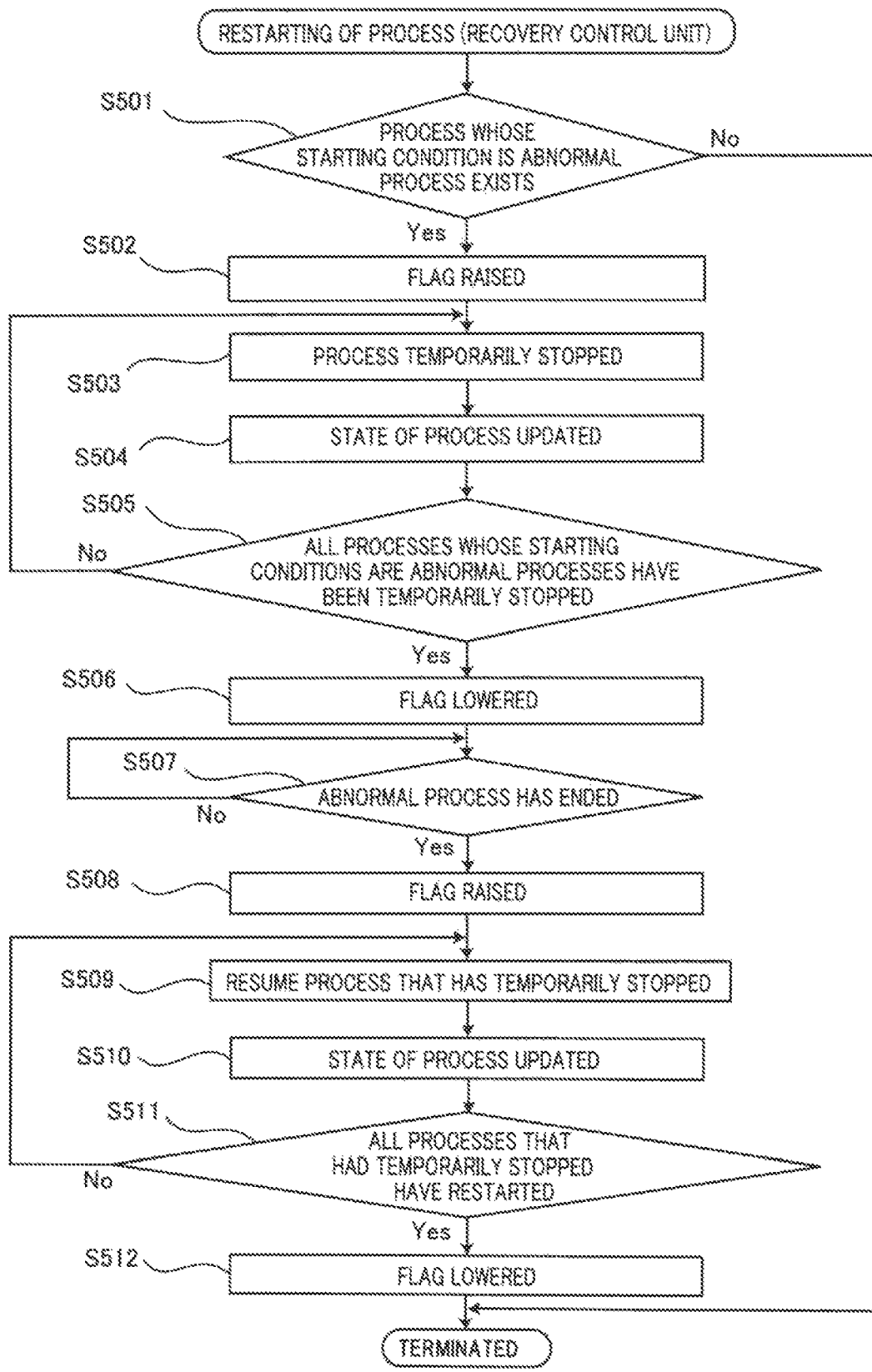
FIG. 15 is a flowchart representing the operation of a recovery control unit in a control apparatus according to Embodiment 2.
Figure 16:
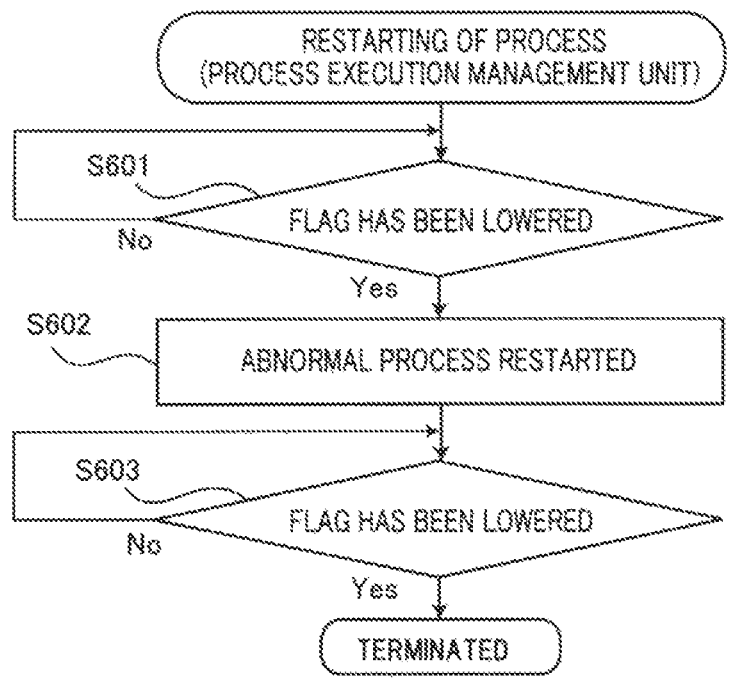
FIG. 16 is a flowchart representing the operation of a process execution management unit in the control apparatus according to Embodiment 2.

There will be explained the process-restarting operation at a time when after detecting an abnormality in a process, the process abnormality monitoring unit 514 has notified the recovery control unit 515 and the process execution management unit 511 of the abnormality in the process. FIG. 15 is a flowchart representing the operation of the recovery control unit in the control apparatus according to Embodiment 2; FIG. 16 is a flowchart representing the operation of the process execution management unit in the control apparatus according to Embodiment 2. The respective processing items according to these flowcharts are performed in parallel with each other.

At first, the operation of the recovery control unit 515 will be explained by use of FIG. 15. In the step S501, from the starting management table, the recovery control unit 515 ascertains whether or not there exists a process whose starting condition is the execution state of an abnormal process, as a process where an abnormality has been detected; in the case where there exists a process whose starting condition is the execution state of the abnormal process (Yes), the step S501 is followed by the step S502; in the case where there exists no process whose starting condition is the execution state of the abnormal process (No), the process-restarting processing is terminated. Specifically, in the case where the abnormal process is the image reception process 602, the process whose stating condition is the execution state of the image reception process 602 is the preprocessing process 603; the process whose stating condition is the execution state of the preprocessing process 603 is the vehicle detection process 604; the process whose stating condition is the execution state of the vehicle detection process 604 is the vehicle control process 605.

In the step S502, the recovery control unit 515 raises a flag indicating that there exists a process whose starting condition is the execution state of an abnormal process; then, the step S502 is followed by the step S503. Based on this flag, the process execution management unit 511 prevents from stopping the process whose starting condition is the execution state of the abnormal process. Specifically, the process execution management unit 511 prevents from stopping the preprocessing process 603 whose starting condition is the execution state of the image reception process 602, which is the abnormal process.

Next, in the step S503, the recovery control unit 515 transmits to the process whose starting condition is the execution state of the abnormal process a signal for temporarily stopping processing of the process; when receiving the signal, the process temporarily stops the processing. As described above, in the step S501, it is determined that there exists preprocessing process 603 whose starting condition is the execution state of the image reception process 602, that there exists the vehicle detection process 604 whose stating condition is the execution state of the preprocessing process 603, and that there exists the vehicle control process 605 whose stating condition is the execution state of the vehicle detection process 604; among these processes, the vehicle control process 605 is not included in the respective starting conditions of the other processes.

The recovery control unit 515 transmits to the vehicle control process 605 a signal saying that the process, of the vehicle control process 605, that is not included in the respective starting conditions of the other processes should be temporarily stopped; when receiving the signal, the vehicle control process 605 stops the process of the vehicle control process 605. In this situation, the vehicle control process 605 stops only the processing; release of the memory area for the process, data storage, and removal of the registrations of the information provider and the information user, registered in the registry of the process communication control unit 512, are not implemented.

In the step S504, in the starting management table, the state of the process that has temporarily been stopped in the preceding step S503 is updated from "under execution" to "terminated", which is a dummy state. Specifically, the state of the vehicle control process 605 is updated from "under execution" to "terminated", as represented in FIG. 17A. In this regard, however, the actual state of the vehicle control process 605 is the one of being temporarily stopped. In this situation, each of FIGS. 17A and 17B is an explanatory table representing the starting management table of the process execution management unit in the control apparatus according to Embodiment 2; FIGS. 17A and 17B represent the respective states of the processes at different stages. In the [process] column in each of FIGS. 17A and 17B, [image reception process], [preprocessing process], [vehicle detection process], and [vehicle control process] are sequentially described from the topmost section; for each of the processes, [whether or not the starting condition exists], [the process that is to become the starting condition], and [the state of the process] are described.

Next, in the step S505 in FIG. 15, it is determined whether or not all of the processes whose starting conditions are the execution state of the abnormal process have been temporarily stopped; in the case where all of the processes have been temporarily stopped (Yes), the step S505 is followed by the step S506; in the case where all of the processes have not been temporarily stopped (No), the step S5303 is resumed. Specifically, because the vehicle detection process 604 and the preprocessing process 603 are under execution, the recovery control unit 515 returns to the step S503 and then executes the step S503 and the step S504 for each of the vehicle detection process 604 and the preprocessing process 603, in that order, as is the case with the vehicle control process 605. Then, when as represented in FIG. 17B, the state of each of the vehicle control process 605, the vehicle detection process 604, and the preprocessing process 603 becomes "terminated", the step S505 is followed by the step S506.

In the step S506, the recovery control unit 515 lowers the flag that has been raised in the step S502. Due to the lowering of this flag, the processing in the step S601 in after-mentioned FIG. 16 is passed through; then, in the step S602, the process execution management unit 511 starts process-terminating processing. In this regard, however, the process execution management unit 511 originally ascertains whether or not there exists a process whose starting condition is the execution state of an abnormal process, and then terminates the process when there exists a process whose starting condition is the execution state of an abnormal process; however, because the process whose starting condition is the execution state of the abnormal process has temporarily been stopped up until the foregoing step S505, the description therefor is omitted in the explanation in FIG. 16.

In the step S507 in FIG. 15, the recovery control unit 515 ascertains whether or not the process execution management unit 511 has restarted the abnormal process; in the case where the abnormal process has been restarted (Yes), the step S507 is followed by the step S508, where the flag is raised; in the case where the restarting of the abnormal process has not been completed (No), the step S507 is executed again; then, the processing of the step S507 is repeated until the abnormal process is restarted. Specifically, in the step S602 in after-mentioned FIG. 16, the process execution management unit 511 restarts the abnormal process; then, when detecting that the state of the abnormal process in the starting management table represented in each of FIGS. 17A and 17B has changed to "under execution", the recovery control unit 515 raises the flag.

Next, in the step S509 in FIG. 15, the recovery control unit 515 transmits a signal for resuming processing to the process whose starting condition is the execution state of the abnormal process that has temporarily been stopped; when receiving the signal, the process starts the processing from a point where the processing has temporarily been stopped. Specifically, the recovery control unit 515 transmits the process-resuming signal to the preprocessing process 603; then, the preprocessing process 603 resumes the processing.

In the step S510, in the starting management table, the state of the process that has been resumed in the preceding step S509 is changed to "under execution". Specifically, the state of the preprocessing process 603 is changed to "under execution". Next, the step S510 is followed by the step S511.

In the step S511, it is determined whether or not all of the processes each of the starting conditions of which is the execution state of an abnormal process have been resumed; in the case where all of the processes have been resumed (yes), the step S511 is followed by the step S512, where the flag is lowered; in the case where there exists a process that has not been resumed (No), the step S509 is resumed. Specifically, because the vehicle detection process 604 and the vehicle control process 605 are "terminated", the recovery control unit 515 returns to the step S509 and then executes the step S509 and the step S510 for each of the vehicle detection process 604 and the vehicle control process 605, in that order, as is the case with the preprocessing process 603. When the state of each of the preprocessing process 603, the vehicle detection process 604, the vehicle control process 605 becomes "under execution", the process-restarting processing by the recovery control unit 515 is terminated.

Next, the operation of the process execution management unit 511 will be explained by use of FIG. 16. In the step S601, the process execution management unit 511 ascertains a flag to be controlled by the recovery control unit 515; in the case where the flag has been lowered (yes), the step S601 is followed by the step S602; in the case where the flag has been raised (No), the step S601 is resumed; then, the processing of the step S601 is repeated until the flag is lowered. Specifically, when the flag is lowered in the step S506 in foregoing FIG. 15, the step S601 is followed by the step S602.

Next, in the step S602, the process execution management unit 511 restarts the abnormal process. Specifically, the process execution management unit 511 restarts the image reception process 602, as the abnormal process. When a process is terminated, it is originally required to ascertain whether or not there exists another process whose starting condition is the execution state of the process; however, because the process has temporarily been stopped by the foregoing recovery control unit 515, the abnormal process can be restarted.

Next, it is ascertained in the step S603 whether or not the flag has been lowered; in the case where the flag has been lowered (Yes), the restarting processing by the process execution management unit 511 is completed; in the case where the flag has been raised (No), the step S603 is resumed, and then the processing in the step S603 is repeated until the flag is lowered. In the present embodiment, after the step S512 in foregoing FIG. 15 has been completed, the restarting processing by the recovery control unit 515 is terminated. In the case where when an abnormal process is restarted, there exist processes each of the respective starting conditions of which is the execution state of the process to be restarted, it is originally required to start also these processes; however, because the processes each of the respective starting conditions of which is the execution state of the process to be restarted have already been started in the foregoing steps S509 through S511 performed by the recovery control unit 515, the starting processing of these processes is omitted.

(2-3) Effect of Control Apparatus According to Embodiment 2

In Embodiment 1, because the process execution management unit, the recovery control unit, and the process abnormality monitoring unit are in a serial relationship and hence the dependency between the process execution management unit and the recovery control unit is high, the coverage of the effect may be expanded at a time when a function is added to the system or a change is applied thereto; however, in Embodiment 2, because the process execution management unit and the recovery control unit are in a parallel relationship and hence the dependency between the process execution management unit and the recovery control unit can be reduced, there is demonstrated an effect that the system can be suppressed from becoming complicated, in addition to the effect of Embodiment 1.

Supplementary Explanation for Embodiments 1 and 2

In each of Embodiments 1 and 2, it may be allowed that the respective functions of the first control apparatus 110, the second control apparatus 120, and the third control apparatus 130 are realized by hardware. FIG. 18 is an explanatory diagram representing the configuration at a time when the respective functions of the first control apparatus, the second control apparatus, and the third control apparatus in each of the control apparatuses according to Embodiments 1 and 2 are realized with hardware items. In FIG. 18, the first control apparatus 110, the second control apparatus 120, and the third control apparatus 130 are provided with each of processing circuits 500 and communication apparatuses 112, 122, and 123, respectively. The processing circuit 500 is referred to also as a processing circuit.

The processing circuit 500 is a dedicated electronic circuit for realizing each of the process execution management units 511, 521, and 531, the process communication control units 512, 522, and 532, and the storage units 513, 523, and 533, as the function units provided in the first control apparatus 110, the second control apparatus 120, the third control apparatus 130, respectively. For example, the processing circuit 500 is formed of a single circuit, a composite circuit, a programmed processor, an in-parallel programmed processor, a logic IC, a GA (Gate Array), an ASIC (Application Specific Integrated Circuit), an FPGA (Field Programmable Gate Array), or a combination of these items. Each of the first control apparatus 110, the second control apparatus 120, and the third control apparatus 130 may be provided with two or more processing circuits that replace the processing circuit 500. The two or more processing circuits bear part of the role of the processing circuit 500.

Although the present application is described above in terms of various exemplary embodiments and implementations, it should be understood that the various features, aspects and functions described in one or more of the individual embodiments are not limited in their applicability to the particular embodiment with which they are described, but instead can be applied, alone or in various combinations to one or more of the embodiments. Therefore, an infinite number of unexemplified variant examples are conceivable within the range of the technology disclosed in the present application. For example, there are included the case where at least one constituent element is modified, added, or omitted and the case where at least one constituent element is extracted and then combined with constituent elements of other embodiments.

What is claimed is:

1. A control apparatus comprising:
a process execution management processor to manage execution of a plurality of processes, a starting condition of at least one of the plurality of processes is an execution state of at least another one of the plurality of processes;
a process abnormality monitoring processor to detect whether there is an abnormality in the plurality of processes; and
a recovery control processor to issue to the process execution management processor an instruction saying that when there exists a first process whose starting condition is an execution state of a second process in which an abnormality has been detected by the process abnormality monitoring processor, all of processes including the first process whose starting condition is the execution state of the second process in which the abnormality has been detected should temporarily be stopped and saying that after the second process has restarted, execution of the processes that have temporarily been stopped should be resumed,
wherein the process execution management processor compares the starting condition of the at least one of the plurality of processes with the at least another one of the plurality of processes;
in a case where there exists a third process whose starting condition coincides with the execution state of the at least another one of the plurality of processes, the process execution management processor starts the third process so that processing is executed; and
when the execution state of the at least another one of the plurality of processes becomes not to coincide with the starting condition of the third process, the process execution management processor stops the third process that has been started and whose processing is under execution, and restarts the second process in which the abnormality has been detected and resumes processing of the third process that has temporarily been stopped, in response to an instruction from the recovery control processor.

2. The control apparatus according to claim 1, wherein in the case where there exists the first process whose starting condition is the execution state of the second process in which an abnormality has been detected, the recovery control processor issues to the process execution management processor an instruction of temporarily stopping execution of the plurality of processes sequentially from a process whose starting condition is not an execution state of another process, among the plurality of processes.

3. The control apparatus according to claim 2, further comprising a process communication control processor to control interchanging of information items among the plurality of processes, wherein when receiving an request from an own process that provides information possessed by the own process to another process, the process communication control processor transmits a message saying that the own process can provide the information to said another process or when receiving an request from the own process that uses information possessed by said another process, the process communication control processor transmits a message saying that the own process requests to use information possessed by said another process; in a case where there exist a process that provides the information and a process that uses the information, the process communication control processor performs interchanging of information between the processes.

4. The control apparatus according to claim 3,
wherein when starting a process that satisfies the starting condition, among the plurality of processes, the process execution management processor secures a memory area for a starting subject process and then generates the starting subject process, and
wherein the generated starting subject process initializes information to be dealt with by itself, notifies the process communication control processor that information possessed by itself can be provided to another process or that use of information possessed by another process is requested, and then notifies the process execution management processor that starting of the own process has been completed.

5. The control apparatus according to claim 4
wherein when receiving an instruction of stopping a process from the process execution management processor or when stopping the process by itself, among the plurality of processes, a process under execution withdraws from the process communication control processor a notification that information possessed by itself can be provided to another process or that its use of information possessed by another process is requested, stores information to be dealt with by itself, and then notifies the process execution management processor that terminating of its own process has been completed, and
wherein when receiving a notification saying that terminating of the process has been completed, the process execution management processor releases the secured memory area and deletes the generated starting subject process.

6. The control apparatus according to claim 1, further comprising a process communication control processor to control interchanging of information items among the plurality of processes, wherein when receiving an request from an own process that provides information possessed by the own process to another process, the process communication control processor transmits a message saying that the own process can provide the information to said another process or when receiving an request from the own process that uses information possessed by said another process, the process communication control processor transmits a message saying that the own process requests to use information possessed by said another process; in a case where there exist a process that provides the information and a process that uses the information, the process communication control processor performs interchanging of information between the processes.

7. The control apparatus according to claim 6,
wherein when starting a process that satisfies the starting condition, among the plurality of processes, the process execution management processor secures a memory area for a starting subject process and then generates the starting subject process, and
wherein the generated starting subject process initializes information to be dealt with by itself, notifies the process communication control processor that information possessed by itself can be provided to another process or that use of information possessed by another process is requested, and then notifies the process execution management processor that starting of the own process has been completed.

8. The control apparatus according to claim 7,
wherein when receiving an instruction of stopping a process from the process execution management processor or when stopping the process by itself, among the plurality of processes, a process under execution withdraws from the process communication control processor a notification that information possessed by itself can be provided to another process or that its use of information possessed by another process is requested, stores information to be dealt with by itself, and then notifies the process execution management processor that terminating of its own process has been completed, and
wherein when receiving a notification saying that terminating of the process has been completed, the process execution management processor releases the secured memory area and deletes the generated starting subject process.

9. The control apparatus according to claim 8,
wherein at least one of the plurality of processes is provided with at least one check point for notifying the process abnormality monitoring processor that specific processing has been executed, and
wherein the process abnormality monitoring processor receives the check points; in a case where reception order of the received check points is different from predetermined reception order, in a case where the number of times of receiving the check points during a predetermined period is different from predetermined reception times, or in a case where a time interval between the received check points is different from a predetermined time interval, the process abnormality monitoring processor determines that the process that has notified it of the check point is abnormal.

10. The control apparatus according to claim 7,
wherein at least one of the plurality of processes is provided with at least one check point for notifying the process abnormality monitoring processor that specific processing has been executed, and
wherein the process abnormality monitoring processor receives the check points; in a case where reception order of the received check points is different from predetermined reception order, in a case where the number of times of receiving the check points during a predetermined period is different from predetermined reception times, or in a case where a time interval between the received check points is different from a predetermined time interval, the process abnormality monitoring processor determines that the process that has notified it of the check point is abnormal.

11. The control apparatus according to claim 6,
wherein at least one of the plurality of processes is provided with at least one check point for notifying the process abnormality monitoring processor that specific processing has been executed, and
wherein the process abnormality monitoring processor receives the check points; in a case where reception order of the received check points is different from predetermined reception order, in a case where the number of times of receiving the check points during a predetermined period is different from predetermined reception times, or in a case where a time interval between the received check points is different from a predetermined time interval, the process abnormality monitoring processor determines that the process that has notified it of the check point is abnormal.

12. The control apparatus according to claim 1,
wherein at least one of the plurality of processes is provided with at least one check point for notifying the process abnormality monitoring processor that specific processing has been executed, and
wherein the process abnormality monitoring processor receives the check points; in a case where reception order of the received check points is different from predetermined reception order, in a case where the number of times of receiving the check points during a predetermined period is different from predetermined reception times, or in a case where a time interval between the received check points is different from a predetermined time interval, the process abnormality monitoring processor determines that the process that has notified it of the check point is abnormal.

13. A control apparatus comprising:
a process execution management processor to manage execution of a plurality of processes, a starting condition of at least one of the plurality of processes is an execution state of at least another one of the plurality of processes;
a process abnormality monitoring processor to detect whether there is an abnormality in the plurality of processes; and
a recovery control processor that raises a flag when there exists a first process whose starting condition is an execution state of a second process in which an abnormality has detected by the process abnormality monitoring processor and makes the process execution management processor temporarily stop processing items of all of processes including the first process whose starting condition is the execution state of the second process in which the abnormality has detected, that lowers the flag when the processing items of all of the processes have temporarily been stopped, that raises the flag and resumes the processing items of all of the processes that have temporarily been stopped, when the second process in which the abnormality has detected restarts, and that lowers the flag when resumption of the processing items of all of the processes has been completed,
wherein the process execution management processor compares the starting condition of the at least one of the plurality of processes with the at least another one of the plurality of processes;
in a case where there exists a third process whose starting condition coincides with the execution state of the at least another one of the plurality of processes, the process execution management processor starts the third process so that processing is executed;
when the execution state of the at least another one of the plurality of processes becomes not to coincide with the starting condition of the third process, the process execution management processor stops the third process that has been started and whose processing is under execution;
in a case where the flag has been raised, the process execution management processor enters a standby state without restarting the second process in which the abnormality has been detected; and
in a case where the flag has been lowered, the process execution management processor executes restarting of the second process in which the abnormality has been detected.

14. The control apparatus according to claim 13, further comprising a process communication control processor to control interchanging of information items among the plurality of processes, wherein when receiving an request from an own process that provides information possessed by the own process to another process, the process communication control processor transmits a message saying that the own process can provide the information to said another process or when receiving an request from the own process that uses information possessed by said another process, the process communication control processor transmits a message saying that the own process requests to use information possessed by said another process; in a case where there exist a process that provides the information and a process that uses the information, the process communication control processor performs interchanging of information between the processes.

15. The control apparatus according to claim 14,
wherein when starting a process that satisfies the starting condition, among the plurality of processes, the process execution management processor secures a memory area for a starting subject process and then generates the starting subject process, and
wherein the generated starting subject process initializes information to be dealt with by itself, notifies the process communication control processor that information possessed by itself can be provided to another process or that use of information possessed by another process is requested, and then notifies the process execution management processor that starting of the own process has been completed.

16. The control apparatus according to claim 15,
wherein when receiving an instruction of stopping a process from the process execution management processor or when stopping the process by itself, among the plurality of processes, a process under execution withdraws from the process communication control processor a notification that information possessed by itself can be provided to another process or that its use of information possessed by another process is requested, stores information to be dealt with by itself, and then notifies the process execution management processor that terminating of its own process has been completed, and wherein when receiving a notification saying that terminating of the process has been completed, the process execution management processor releases the secured memory area and deletes the generated starting subject process.

17. The control apparatus according to claim 16,
wherein at least one of the plurality of processes is provided with at least one check point for notifying the process abnormality monitoring processor that specific processing has been executed, and
wherein the process abnormality monitoring processor receives the check points; in a case where reception order of the received check points is different from predetermined reception order, in a case where the number of times of receiving the check points during a predetermined period is different from predetermined reception times, or in a case where a time interval between the received check points is different from a predetermined time interval, the process abnormality monitoring processor determines that the process that has notified it of the check point is abnormal.

18. The control apparatus according to claim 15,
wherein at least one of the plurality of processes is provided with at least one check point for notifying the process abnormality monitoring processor that specific processing has been executed, and
wherein the process abnormality monitoring processor receives the check points; in a case where reception order of the received check points is different from predetermined reception order, in a case where the number of times of receiving the check points during a predetermined period is different from predetermined reception times, or in a case where a time interval between the received check points is different from a predetermined time interval, the process abnormality monitoring processor determines that the process that has notified it of the check point is abnormal.

19. The control apparatus according to claim 14,
wherein at least one of the plurality of processes is provided with at least one check point for notifying the process abnormality monitoring processor that specific processing has been executed, and
wherein the process abnormality monitoring processor receives the check points; in a case where reception order of the received check points is different from predetermined reception order, in a case where the number of times of receiving the check points during a predetermined period is different from predetermined reception times, or in a case where a time interval between the received check points is different from a predetermined time interval, the process abnormality monitoring processor determines that the process that has notified it of the check point is abnormal.

20. The control apparatus according to claim 13,
wherein at least one of the plurality of processes is provided with at least one check point for notifying the process abnormality monitoring processor that specific processing has been executed, and
wherein the process abnormality monitoring processor receives the check points; in a case where reception order of the received check points is different from predetermined reception order, in a case where the number of times of receiving the check points during a predetermined period is different from predetermined reception times, or in a case where a time interval between the received check points is different from a predetermined time interval, the process abnormality monitoring processor determines that the process that has notified it of the check point is abnormal.

* * * * *